(12) United States Patent
McAllister

(10) Patent No.: US 10,907,551 B2
(45) Date of Patent: Feb. 2, 2021

(54) CONTROLLING INTAKE VALVES IN AN INTERNAL COMBUSTION ENGINE

(71) Applicant: JAGUAR LAND ROVER LIMITED, Warwickshire (GB)

(72) Inventor: Matthew McAllister, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/319,625

(22) PCT Filed: Jul. 21, 2017

(86) PCT No.: PCT/EP2017/068485
§ 371 (c)(1),
(2) Date: Jan. 22, 2019

(87) PCT Pub. No.: WO2018/019718
PCT Pub. Date: Feb. 1, 2018

(65) Prior Publication Data
US 2019/0345880 A1 Nov. 14, 2019

(30) Foreign Application Priority Data
Jul. 26, 2016 (GB) .................................. 1612885.2

(51) Int. Cl.
*F02D 13/02* (2006.01)
*F01L 9/02* (2006.01)
(Continued)

(52) U.S. Cl.
CPC .......... *F02D 13/0257* (2013.01); *F01L 9/025* (2013.01); *F02B 31/04* (2013.01); *F02B 2031/006* (2013.01)

(58) Field of Classification Search
CPC ... F02D 13/0257; F01L 9/025; F01L 2800/06; F01L 13/0005; F01L 1/053; F01L 1/08;
(Continued)

(56) References Cited

U.S. PATENT DOCUMENTS 3,926,159 A * 12/1975 Michelson ................ F01L 9/02
 123/90.11
4,000,756 A * 1/1977 Ule ........................... F01L 9/02
 137/596.17

(Continued)

FOREIGN PATENT DOCUMENTS

EP 2796675 A1 10/2014
EP 2801706 A1 11/2014
(Continued)

OTHER PUBLICATIONS

Combined Search and Examination Report under Sections 17 and 18(3) for Application No. GB1612885.2 dated Jan. 25, 2017.
(Continued)

*Primary Examiner* — Joseph J Dallo
(74) *Attorney, Agent, or Firm* — Carlson, Gaskey & Olds

(57) ABSTRACT

An apparatus (201) and method for controlling intake valves (23) in an internal combustion engine (5), as well as an internal combustion engine and a vehicle comprising the apparatus, and an electronic processor for performing the method is disclosed. The apparatus comprises a hydraulic system (3) configured to hydraulically actuate a first intake valve (23a) and a second intake valve (23b) of a first combustion chamber (25) of an internal combustion engine (5). The apparatus also includes a controller (9) configured to control the hydraulic system (3) in at least a first mode of operation and a second mode of operation. In the first mode of operation, the controller (9) is configured to control the hydraulic system (3) to cause lifting of the first and second intake valves (23a, 23b) of the first combustion chamber
(Continued)

(25) during each intake stroke of a respective cylinder piston (27). In the second mode of operation, the controller (9) is configured to control the hydraulic system (3) to cause lifting of the first intake valve (23a) of the first combustion chamber (25) during an intake stroke of the respective cylinder piston (27) and disable actuation of the second intake valve (23b) of the first combustion chamber (25) during that intake stroke.

20 Claims, 16 Drawing Sheets

(51) Int. Cl.
    *F02B 31/04*    (2006.01)
    *F02B 31/00*    (2006.01)

(58) Field of Classification Search
    CPC ..... F01L 1/26; F01L 1/267; F01L 3/06; F01L 9/02; F02B 31/04; F02B 2031/006; Y02T 10/146
    See application file for complete search history.

(56) References Cited

U.S. PATENT DOCUMENTS

| | | | |
|---|---|---|---|
| 5,269,270 A | * | 12/1993 | Suzuki .............. F01L 1/267 |
| | | | 123/193.5 |
| 2005/0263116 A1 | | 12/2005 | Babbitt et al. |
| 2011/0168111 A1 | * | 7/2011 | Cowgill .............. F01L 9/02 |
| | | | 123/90.12 |

FOREIGN PATENT DOCUMENTS

| | | |
|---|---|---|
| GB | 2376046 A | 12/2002 |
| GB | 2454314 A | 5/2009 |
| WO | 03/023197 A1 | 3/2003 |

OTHER PUBLICATIONS

International Search Report and Written Opinion of the International Searching Authority for International application No. PCT/EP2017/068485 dated Nov. 17, 2017.

* cited by examiner

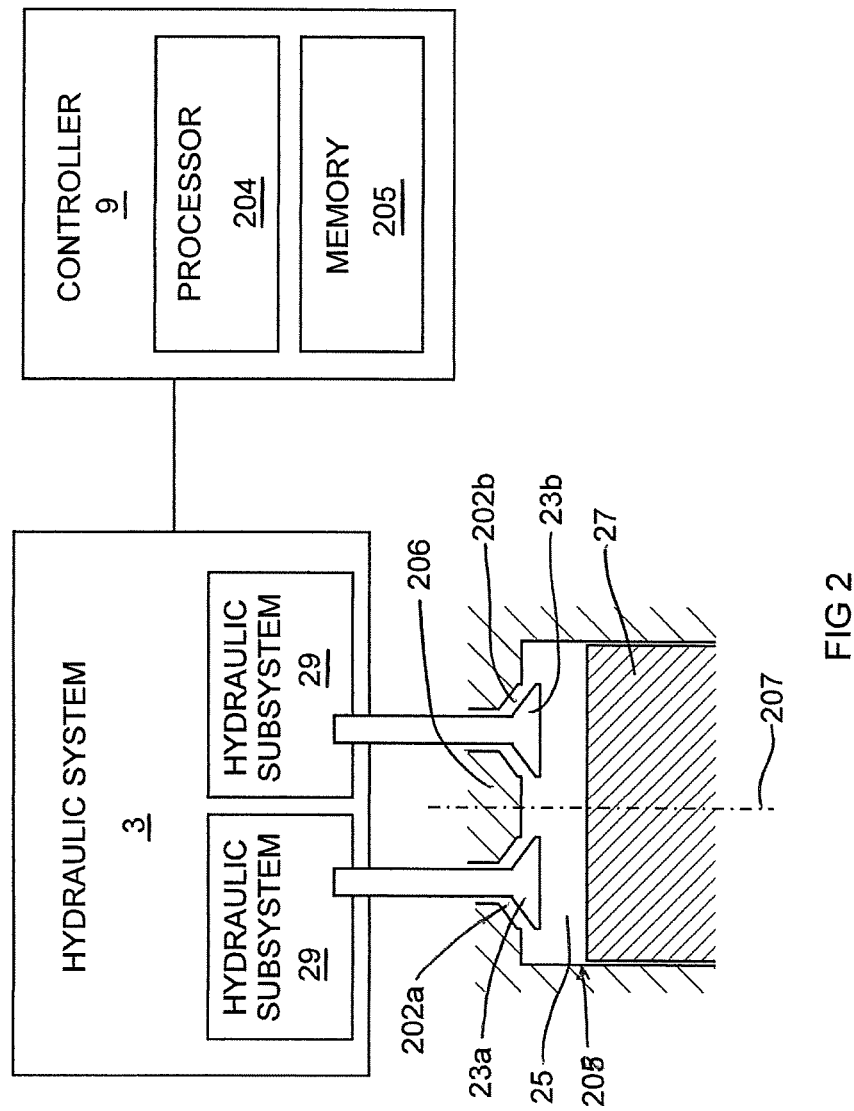

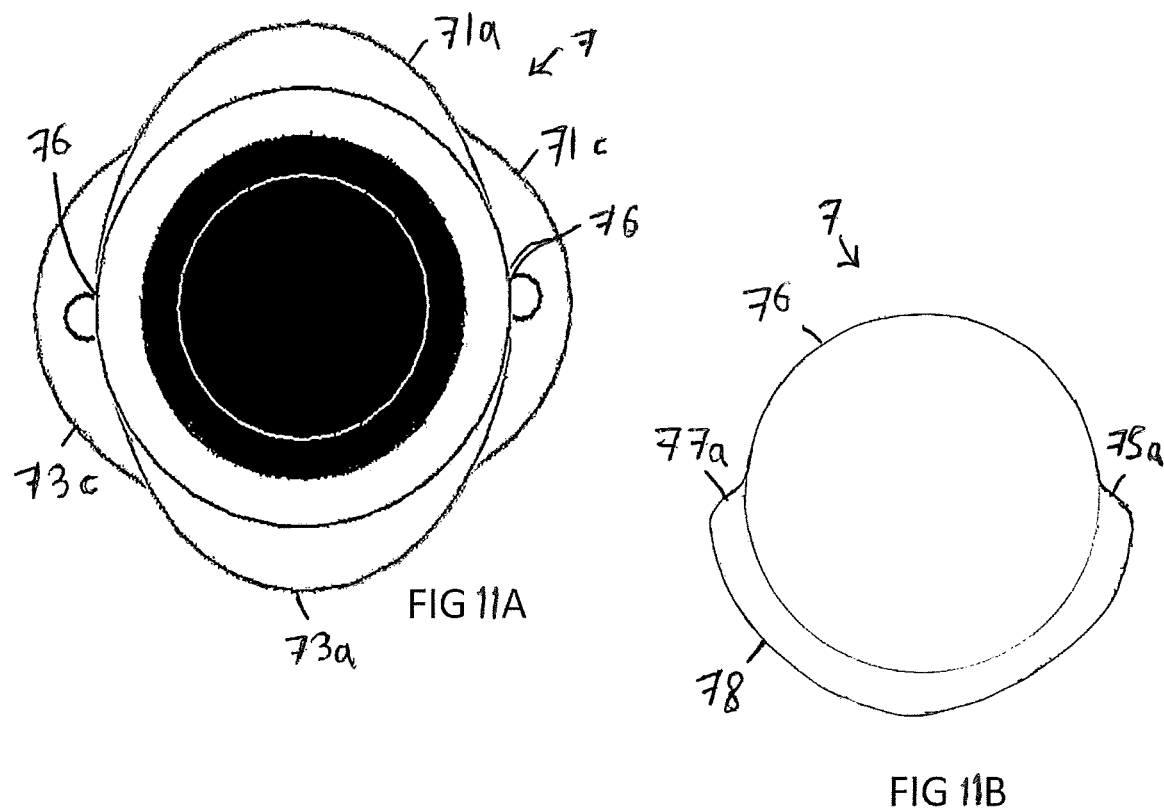
FIG 11A
FIG 11B
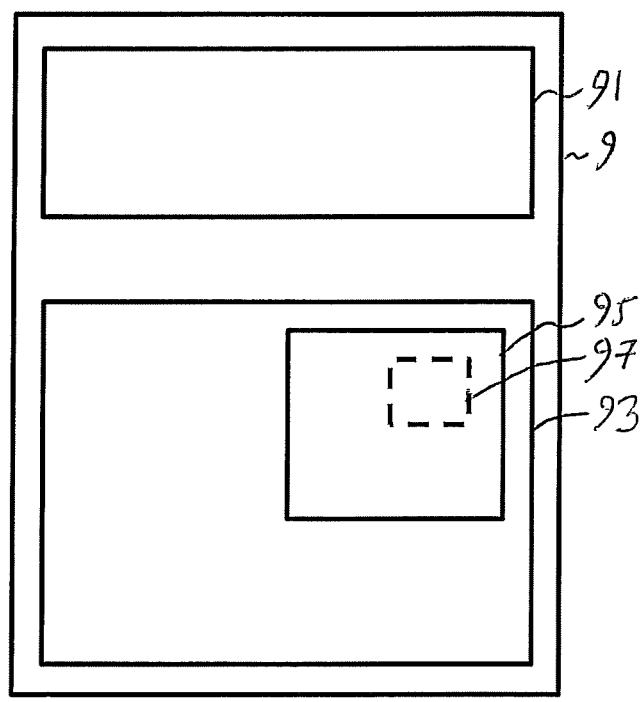
FIG 12
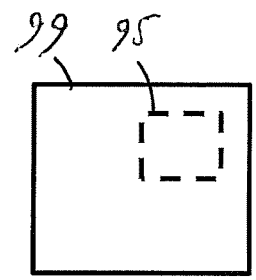
FIG 13

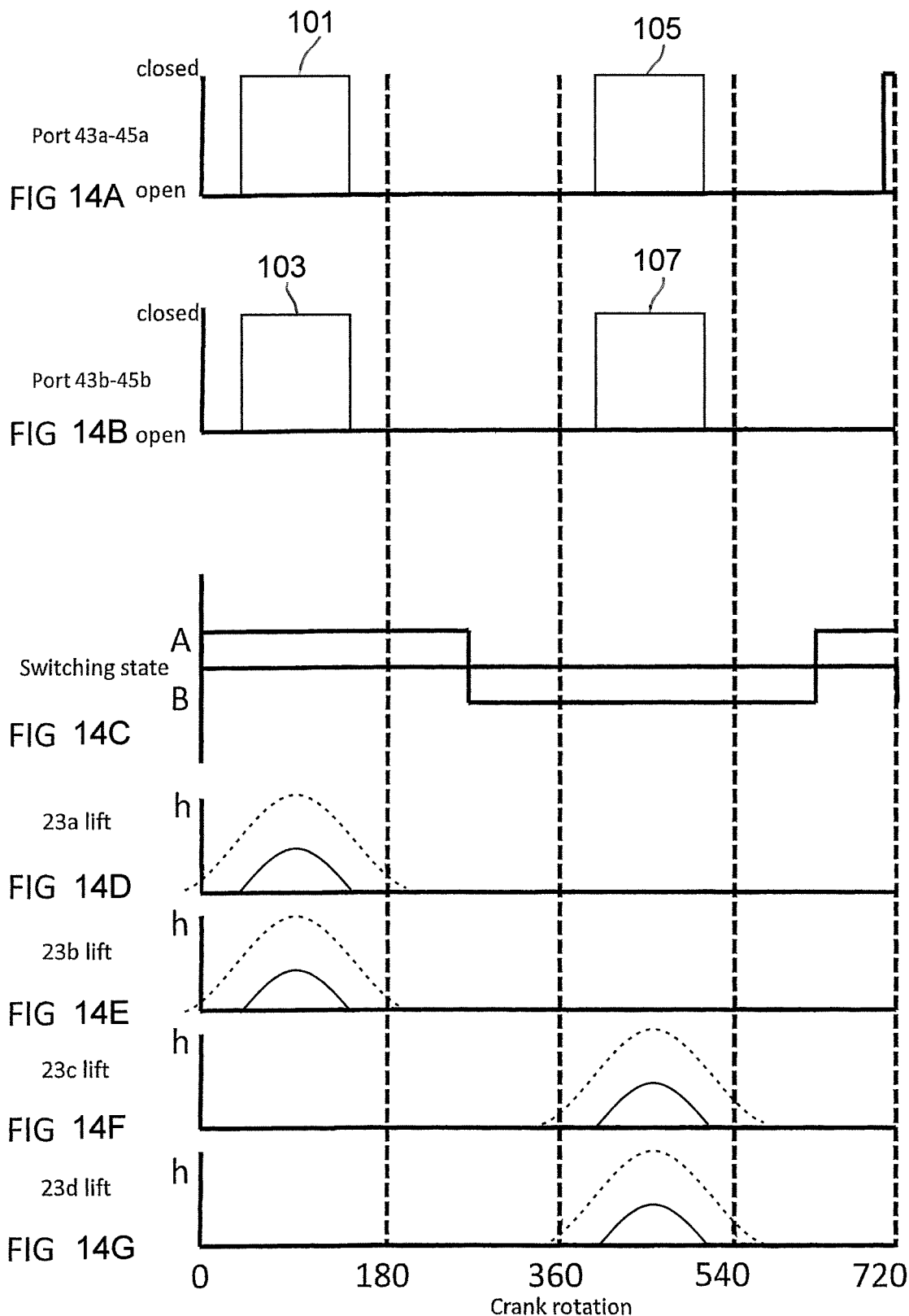

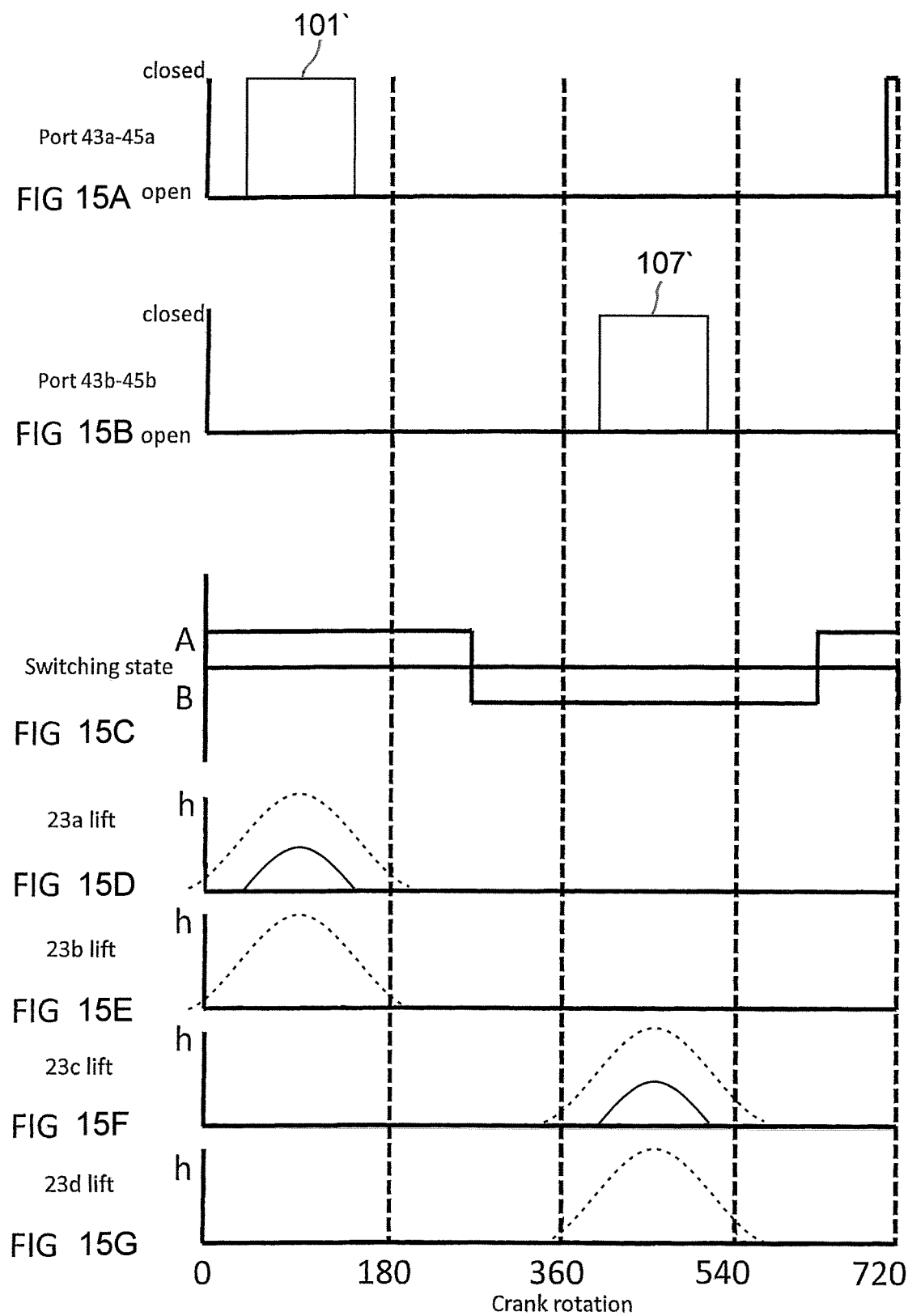

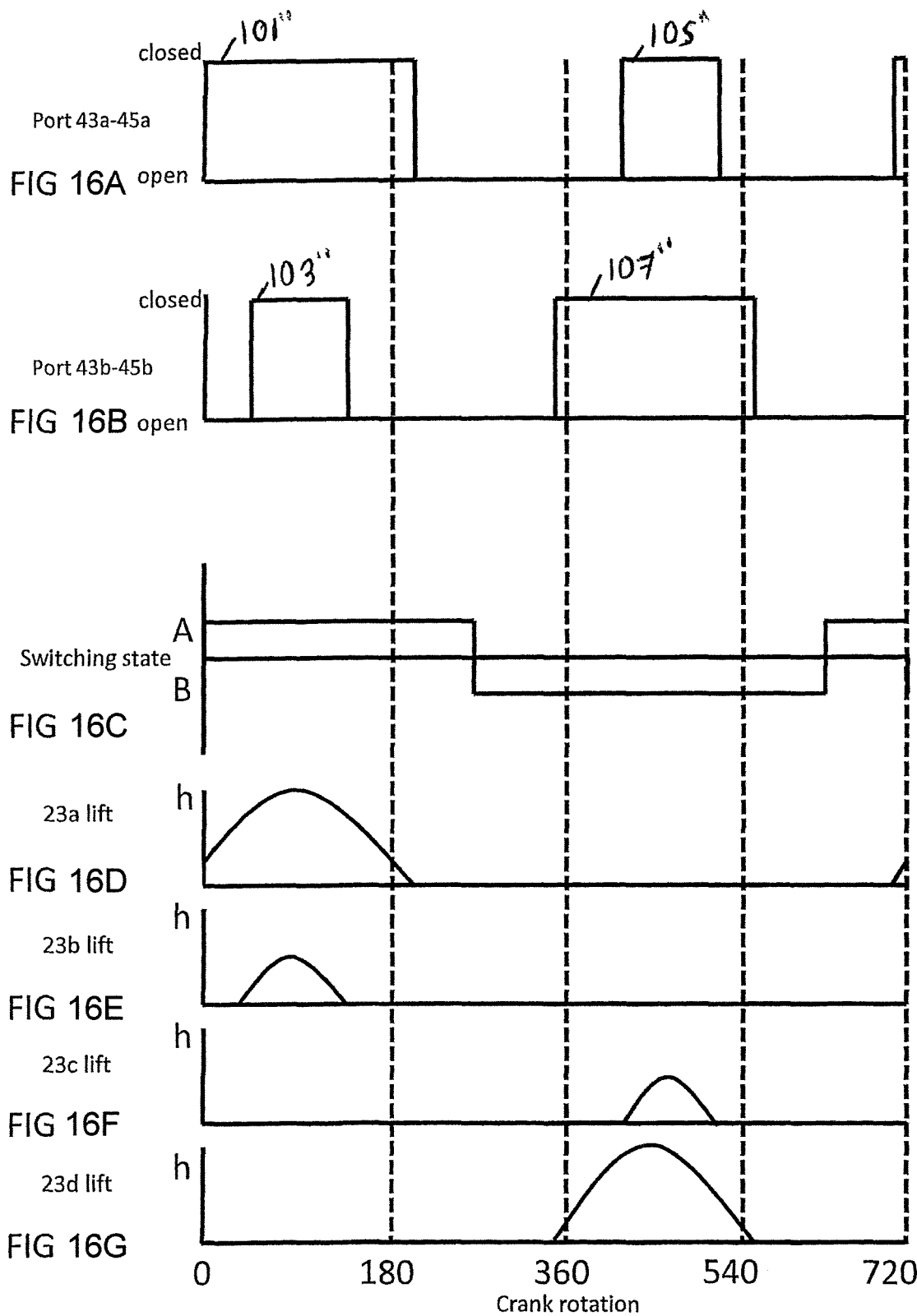

CONTROLLING INTAKE VALVES IN AN INTERNAL COMBUSTION ENGINE

TECHNICAL FIELD

The present disclosure relates to an apparatus and method for controlling intake valves in an internal combustion engine, as well as an internal combustion engine and a vehicle comprising the apparatus, and an electronic processor for performing the method. In particular, but not exclusively it relates to an apparatus and method for controlling intake valves in an internal combustion engine in a road vehicle.

Aspects of the invention relate to an apparatus, an internal combustion engine, a vehicle, a method and a control means comprising an electronic controller.

BACKGROUND

At a predetermined time during a combustion cycle of an internal combustion engine, an intake valve (or inlet poppet valve) is lifted away from a valve seat and into a combustion chamber, to open an inlet port and allow the intake of air into the combustion chamber through the inlet port. At a later predetermined time during the combustion cycle, the intake valve is returned to the valve seat to close the inlet port.

A combustion chamber may comprise a plurality of inlet ports, each inlet port opened and closed by an intake valve.

It is known for the lifting of intake valves to be controlled by apparatus (e.g. a camshaft and valve train). The valve train may comprise a hydraulic control system actuated by the camshaft. The displacement of fluid within the hydraulic control system during actuation by the camshaft moves small pistons within hydraulic cylinders. Each piston pushes a valve stem of an intake valve to lift the intake valve.

It is known to vary the time over which the intake valves are lifted, and the height to which they are lifted, in dependence upon the magnitude of torque that is required from the engine.

A problem with such existing systems is that the type of airflow into the combustion chamber from the inlet ports cannot be optimized for high efficiency and low pollutant emissions for the full range of magnitudes of torque that may be required from the engine.

It is an aim of the present invention to address disadvantages of the prior art.

SUMMARY OF THE INVENTION

Aspects and embodiments of the invention provide an apparatus, an internal combustion engine, a vehicle, a method and a control means comprising an electronic controller as claimed in the appended claims.

According to an aspect of the invention there is provided an apparatus for controlling intake valves for an internal combustion engine, the apparatus comprising: a hydraulic system configured to hydraulically actuate a first intake valve and a second intake valve of a first combustion chamber of an internal combustion engine; and a controller configured to control the hydraulic system in at least a first mode of operation and a second mode of operation, wherein in the first mode of operation, the controller is configured to control the hydraulic system to cause lifting of the first and second intake valves of the first combustion chamber during each intake stroke of a respective cylinder piston, and in the second mode of operation the controller is configured to control the hydraulic system to cause lifting of the first intake valve of the first combustion chamber during an intake stroke of the respective cylinder piston and disable actuation of the second intake valve of the first combustion chamber during that intake stroke.

This provides the advantage that the way in which air circulates within the combustion chamber may be changed in a way that allows efficient and stable combustion of fuel over a wide range of engine loads.

In some embodiment, in use, the first and second intake valves are configured to close first and second intake ports respectively of the first combustion chamber. In the first mode of operation the first and second intake valves may be arranged to open simultaneously and close simultaneously, and the first and second intake ports are configured to provide tumble motion of air in the combustion chamber. The first port and/or the second port of the first combustion chamber are provided with masking to increase air velocities into the first combustion chamber. In the second mode of operation the first port may be configured to: cause swirl motion of air in the first combustion chamber when the first intake valve is lifted by a first distance; and cause a combination of swirl and tumble motion when the first intake valve is lifted by a second distance that is larger than the first distance.

In some embodiments, the first mode or the second mode is selected in dependence on a required engine torque.

In some embodiments, the controller is arranged to receive an input signal indicative of required engine torque from a user input device, and the first mode or the second mode is selected in dependence on the received input signal.

In some embodiments, the controller is arranged to cause transitioning from the second mode to the first mode in two successive intake strokes and/or from the first mode to the second mode in two successive intake strokes.

In some embodiments, the controller is arranged to cause the first intake valve to have a first lifting distance, in the second mode of operation, during one of the two successive intake strokes, and to cause the first intake valve and the second intake valve to have a second lifting distance, in the first mode of operation, that is smaller than the first lifting distance in the other one of the two successive intake strokes.

This provides the advantage that the transition from the second mode to the first mode, or from the first mode to the second mode, may be made smoothly with no abrupt change in power generated by the engine.

In some embodiments, the controller is arranged to cause the first intake valve to open for a first opening period of time, in the second mode of operation, during one of two successive intake strokes, and to cause the first intake valve and the second intake valve to open, in the first mode, for a second opening period of time that is shorter than the first opening period of time in the other one of the two successive intake strokes.

This provides the advantage that the transition from the second mode to the first mode may be made smoothly with no abrupt change in power generated by the engine.

The second mode may be selected in dependence on a required engine torque.

The controller may be arranged to receive an input signal indicative of required engine torque from a user input device, and the second mode is selected in dependence on the received input signal.

In some embodiments the controller may be arranged to cause transitioning from the first mode to the second mode in two successive intake strokes.

In some embodiments the controller is arranged to cause the first intake valve and the second intake valve to have a third lifting distance, in the first mode of operation, during a first of two successive intake strokes, and to cause the first intake valve to have a fourth lifting distance, in the second mode of operation that is larger than the first lifting distance in a second of the two successive intake strokes.

In some embodiments, the hydraulic system comprises: a master piston, which is arranged to be actuated by a camshaft; a slave piston arranged to actuate the first intake valve and to be actuated by movement of hydraulic fluid in a passage caused by movement of the master piston; and valve means arranged to enable hydraulic fluid to be released from the passage to allow lifting of the first intake valve to be varied.

This provides the advantage that the energy required to lift the intake valve is provided by the cam shaft. By this arrangement, it is also possible to ensure that the intake valve cannot come into contact with the cylinder piston, even if the means for adjusting valve lifting (i.e. the valve means) failed.

The valve means may comprise a valve arranged to release hydraulic fluid from the passage in dependence upon received signal. The valve may comprise a solenoid valve. The controller may be arranged to provide a signal to control the valve means in dependence on a required engine torque.

The controller may be arranged to: cause the valve means to release hydraulic fluid for a first period at the beginning of an intake stroke to cause late intake valve opening; cause the valve means to close for a second period to cause intake valve lifting; and cause the valve means to provide a second release of hydraulic fluid in a third period of the same stroke to cause early intake valve closing.

This provides the advantage of late intake valve opening being controlled independently of early intake valve closing.

In some embodiments, the hydraulic system comprises: a second slave piston configured to lift the second intake valve in dependence on movement of hydraulic fluid in a second passage during the first mode of operation; and a second valve means operable to release hydraulic fluid from the second passage to prevent movement of the second slave piston during the second mode of operation.

The advantage of this is that it provides a way in which the intake valves of a single combustion chamber may be operated independently of one another.

The controller may be arranged to control actuation of the second valve means in the first mode of operation to enable variable lifting of the second intake valve.

This provides the advantage that the second intake valve may be operated in the same way, with the same timing and lifting, as the first intake valve.

In some embodiments, the hydraulic system comprises: a master piston, which is arranged to be actuated by a camshaft; a slave piston arranged to actuate the first intake valve and to be actuated by movement of hydraulic fluid in a first passage caused by movement of the master piston; another slave piston arranged to actuate an intake valve of a second combustion chamber and to be actuated by movement of hydraulic fluid in a another different passage caused by movement of the master piston.

This provides the advantage that only one master piston is required to control two different intake valves in two different combustion chambers, while each of two intake valves of a combustion chamber may be independently actuated.

In some embodiments, the apparatus is arranged to cause simultaneous lifting and closing of the first and second intake valves in the first mode of operation.

This provides the advantage that a tumble-type air circulation may be formed in the combustion chamber.

The combustion chamber is located within a cylinder along which a respective cylinder piston moves along an axis. A tumble-type air circulation is one in which the air circulates about an axis that is perpendicular to the axis along which the cylinder piston moves.

In an embodiment the apparatus comprises: a first piston arranged to control a lift of the first intake valve; a second piston arranged to control a lift of the second intake valve; a third piston arranged to control a lift of a first intake valve of a second combustion chamber; a fourth piston arranged to control a lift of a second intake valve of the second combustion chamber; a first hydraulic control subsystem arranged to operate, at different times, the first piston and the third piston, but not the second piston and the fourth piston; and a second hydraulic control subsystem arranged to operate, at different times, the second piston and the fourth piston, but not the first piston and the third piston.

This provides the advantage that only one hydraulic subsystem is required to control two different intake valves, while enabling each of the two intake valves of a combustion chamber to be independently actuated.

The controller may comprise an electronic memory device storing computer program instructions and an electronic processor configured to operate in accordance with the computer program instructions to cause the hydraulic system to operate in at least the first mode and the second mode of operation.

According to another aspect of the invention there is provided an internal combustion engine comprising: an apparatus as described in one of the previous paragraphs, comprising a first combustion chamber having a first port closable by a first intake valve, which is arranged to be actuated by the hydraulic system and a second port closable by a second intake valve, which is arranged to be actuated by the hydraulic system.

In some embodiments, in the first mode of operation, the first and second intake valves are arranged to open simultaneously and close simultaneously and the first and second intake ports are configured to provide tumble motion of air in the combustion chamber.

This provides the advantage that a tumble-type air circulation may be formed in the combustion chamber.

In some embodiments, the first port and the second port of the first combustion chamber are provided with masking to increase air velocities into the first combustion chamber.

This provides the advantage that tumble-type air circulation may be generated in the combustion chamber when the intake valves are only lifted by relatively small distances.

In some embodiments, in the second mode of operation the first port is configured to: cause swirl motion of air in the combustion chamber when the first intake valve is lifted by a first distance; and cause a combination of swirl and tumble motion when the first intake valve is lifted by a second distance that is larger than the first distance.

This provides the advantage of efficient and stable combustion of fuel within the combustion chamber.

A swirl motion of air within the combustion chamber is one in which air circulates around an axis along which the respect cylinder piston moves.

According to a further aspect of the invention there is provided a vehicle having an internal combustion engine according to any one of the preceding paragraphs. The vehicle may be a road vehicle.

According to a still further aspect of the invention there is provided a method of controlling intake valves for an internal combustion engine in which each combustion chamber has a respective piston, a first intake valve and a second intake valve, the method comprising: in a first mode of operation, causing hydraulic actuation of the first and second intake valves of a first combustion chamber during each intake stroke of the respective piston; and in a second mode of operation, causing hydraulic actuation of the first intake valve of the first combustion chamber and disabling actuation of the second intake valve of the first combustion chamber during each intake stroke of the respective piston.

This provides the advantage that the way in which air circulates within the combustion chamber is changed in a way that provides efficient and stable combustion of fuel over a wide range of engine loads.

In some embodiments, the first mode is selected in dependence on a required engine torque.

In some embodiments, the method comprises transitioning from the second mode to the first mode in successive intake strokes.

In some embodiments, during a first of two successive intake strokes, in the second mode of operation, the first intake valve has a first lifting distance, and, during a second of the two successive intake strokes, in the first mode of operation, the first intake valve and the second intake valve have a second lifting distance that is smaller than the first lifting distance.

This provides the advantage of enabling a smooth transition from the second mode to the first mode of operation.

In some embodiments, during a first of two successive intake strokes, in the second mode of operation, the first intake valve is open for a first period of time, and, during a second of the two successive intake strokes, in the first mode of operation, the first intake valve and the second intake valve are open for a second period of time, the second period of time being shorter than the first period of time.

This provides the advantage of enabling a smooth transition from the second mode to the first mode of operation.

In some embodiments, the hydraulic actuation of the first intake valve is performed by a hydraulic system comprising: a master piston, which is arranged to be actuated by a camshaft; a slave piston arranged to actuate the first intake valve and to be actuated by movement of hydraulic fluid in a passage caused by movement of the master piston; and valve means arranged to enable hydraulic fluid to be released from the passage to allow lifting of the first intake valve to be varied.

In some embodiments, the method comprises: causing the valve means to release hydraulic fluid for a first period at the beginning of an intake stroke to cause late intake valve opening; causing the valve means to close for a second period in the same intake stroke to cause intake valve lifting; and causing the valve means to provide a second release of hydraulic fluid in a third period of the same intake stroke to cause early intake valve closing.

This provides the advantage of late intake valve opening and early intake valve closing in the same intake stroke.

According to a still further aspect of the invention there is provided a computer program product comprising a computer program that when run on a processor causes the processor to perform a method as described above.

According to a still further aspect of the invention there is provided a control means comprising an electronic controller for controlling intake valves for an internal combustion engine, the electronic controller being configured to control a hydraulic system for actuating a first intake valve and a second intake valve of a first combustion chamber of an internal combustion engine, wherein in the first mode of operation, the electronic controller is configured to control the hydraulic system to cause lifting of the first and second intake valves of the first combustion chamber during an intake stroke of a respective cylinder piston, and in a second mode of operation, the electronic controller is configured to control the hydraulic system to cause lifting of the first intake valve of the first combustion chamber during an intake stroke of the respective cylinder piston and disable actuation of the second intake valve of the first combustion chamber during that intake stroke.

According to yet another aspect of the invention there is provided an apparatus for controlling intake valves for an internal combustion engine, the apparatus comprising: an actuation system configured to actuate a first intake valve of a first tumble port and a second intake valve of a second tumble port of a first combustion chamber of an internal combustion engine; and a controller configured to control the actuation system in at least a first mode of operation and a second mode of operation, wherein in the first mode of operation, the controller is configured to control the actuation system to cause lifting of the first and second intake valves of the first combustion chamber during each intake stroke of a respective cylinder piston, and in a second mode of operation, the controller is configured to control the actuation system to cause lifting of the first intake valve of the first combustion chamber during an intake stroke of the respective cylinder piston and disable actuation of the second intake valve of the first combustion chamber during that intake stroke, and wherein the first and second tumble ports are arranged to provide tumble motion of air in the first combustion chamber in the first mode of operation, and the first tumble port is positioned to cause swirl motion of air in the first combustion chamber for a first lifting distance of the first intake valve and a combination of swirl and tumble motion for a second lifting distance of the first intake valve that is larger than the first lifting distance in the second mode of operation.

This provides the advantage that the way in which air circulates within the combustion chamber is changed in a way that provides efficient and stable combustion of fuel over a wide range of engine loads.

According to an aspect of the invention there is provided an apparatus for controlling intake valves for an internal combustion engine, the apparatus comprising: a hydraulic system configured to hydraulically actuate a first intake valve and a second intake valve of a first combustion chamber of an internal combustion engine; and a controller configured to control the hydraulic system in at least a first mode of operation and a second mode of operation, wherein in the first mode of operation, the controller is configured to control the hydraulic system to cause simultaneous lifting and closing of the first and second intake valves of the first combustion chamber during each intake stroke of a respective cylinder piston, and in a second mode of operation, the controller is configured to control the hydraulic system to cause lifting of the first intake valve of the first combustion chamber by a first distance and lifting of the second intake valve of the first combustion chamber by a second different distance during an intake stroke of the respective cylinder piston.

This provides the advantage that different types of air circulation may be provided in the combustion chamber depending upon engine load requirements.

According to yet another aspect of the invention there is provided an apparatus for controlling intake valves for an internal combustion engine, the apparatus comprising: a hydraulic system comprising a master piston, which is arranged to be actuated by a camshaft, a slave piston arranged to actuate an intake valve of a combustion chamber and to be actuated by movement of hydraulic fluid within a passage caused by movement of the master piston, and valve means arranged to enable hydraulic fluid to be released from the passage; and a controller configured to control the hydraulic system wherein the controller is arranged to cause the valve means to release hydraulic fluid for a first period at the beginning of an intake stroke to cause late intake valve opening, cause the valve means to close for a second period during the intake stroke; and cause the valve means to provide a second release of hydraulic fluid in a third period of the same stroke to cause early intake valve closing.

In some embodiments, the controller is configured to adjust the duration of the first period and the duration of the second period independently of one another. That is, the period of time by which intake valve opening is delayed is adjusted independently of the period for which the intake valve is opened.

The apparatus may be for controlling intake valve movement within the internal combustion engine of a road vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 2 shows schematically an apparatus 201 for controlling intake valves 23 in the internal combustion engine 5;

FIG. 11A shows an example transverse cross-section through the camshaft 7 of FIG. 10A;

FIG. 11B shows another cross-section of the camshaft 7 illustrating switching portions 75a, 77a on the camshaft 7, at a different axial location on the camshaft 7 from the first cams 71a, 73a;

FIG. 12 shows an example of the electronic controller 9;

FIG. 13 shows a computer program product 99 comprising a computer program 95;

FIG. 14A shows a graph of an example time history demonstrating operation of a first hydraulic subsystem 29a to control lifting of the first and third slave pistons 21a, 21c in a first mode of operation;

FIG. 14B shows a graph of an example time history demonstrating operation of a second hydraulic subsystem 29b to control lifting of the second and fourth slave pistons 21b, 21d in the first mode of operation;

FIG. 14C shows a graph illustrating changing switching states of a switching means 31;

FIGS. 14D-14G show graphs illustrating lift distances of intake valves 23a-23d respectively in a first mode of operation;

FIG. 15A shows a graph of an example time history demonstrating operation of a first hydraulic subsystem 29a to control lifting of the first and third slave pistons 21a, 21c in a second mode of operation;

FIG. 15B shows a graph of an example time history demonstrating operation of a second hydraulic subsystem 29b to control lifting of the second and fourth slave slave pistons 21b, 21d in the second mode of operation;

FIG. 15C shows a graph illustrating changing switching states of a switching means 31;

FIGS. 15D-15G show graphs illustrating lift distances of intake valves 23a-23d respectively in the second mode of operation;

FIG. 16A shows a graph of an example time history demonstrating operation of a first hydraulic subsystem 29a to control lifting of the first and third slave pistons 21a, 21c in an alternative to the second mode of operation;

FIG. 16B shows a graph of an example time history demonstrating operation of a second hydraulic subsystem 29b to control lifting of the second and fourth slave pistons 21b, 21d in the alternative to the second mode of operation;

FIG. 16C shows a graph illustrating changing switching states of a switching means 31; and FIGS. 16D-16G show graphs illustrating lift distances of intake valves 23a-23d respectively in the alternative to the second mode of operation.

DETAILED DESCRIPTION

Figure 1:
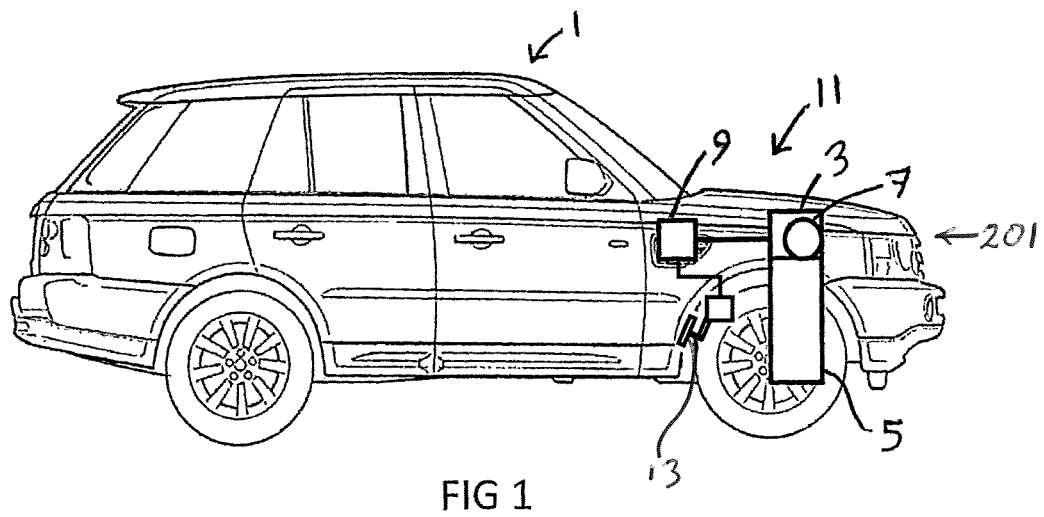
FIG. 1 shows schematically a vehicle 1 that includes an apparatus 201 for controlling intake valves (not shown in FIG. 1) in an internal combustion engine 5.

The Figures illustrate an apparatus 201 for controlling intake valves 23 in an internal combustion engine 5, the apparatus comprising: a hydraulic system 3 configured to hydraulically actuate a first intake valve 23a and a second intake valve 23b of a first combustion chamber 25 of an internal combustion engine 5; and a controller 9 configured to control the hydraulic system 3 in at least a first mode of operation and a second mode of operation, wherein in the first mode of operation, the controller 9 is configured to control the hydraulic system 3 to cause lifting of the first and second intake valves 23a, 23b of the first combustion chamber 25 during each intake stroke of a respective cylinder piston 27, and in a second mode of operation, the controller 9 is configured to control the hydraulic system 3 to cause lifting of the first intake valve 23a of the first combustion chamber 25 during an intake stroke of the respective cylinder piston 27 and disable actuation of the second intake valve 23b of the first combustion chamber 25 during that intake stroke.

A vehicle 1 is shown in FIG. 1, which includes an apparatus 201 for controlling intake valves (or inlet poppet valves, not shown in FIG. 1) in an internal combustion engine 5. The internal combustion engine 5 may comprise multiple cylinders (not shown in FIG. 1). The vehicle 1 may be a road vehicle 1, such as a passenger vehicle 1.

The vehicle 1 comprises an internal combustion engine 5, for providing motive power to the vehicle 1. The vehicle 1 comprises a camshaft 7 associated with the internal combustion engine 5. The apparatus 201 comprises a hydraulic system 3, which may comprise a valve train module 3 arranged to control movement of the intake valves of the internal combustion engine 5 as described below. The apparatus 201 further comprises a controller 9 for controlling the hydraulic system 3. The controller 9 may be configured to receive input signals, indicative of a required torque, from an accelerator pedal (or gas pedal) 13. The controller 9 may be configured to control the internal combustion engine 5 and the hydraulic system 3 in dependence of the input signals received from the accelerator pedal 13.

An apparatus 201 for controlling intake valves 23 in the internal combustion engine 5 is shown schematically in FIG. 2. The hydraulic system 3 is arranged to actuate the intake valves 23 of the internal combustion engine 5. In FIG. 2 only one combustion chamber 25 defined by a cylinder wall 208, a cylinder head 206 and the upper part of a respective cylinder piston 27 is shown, but it should be understood that the internal combustion engine may have two or more similar combustion chambers 25 with respective cylinder pistons 27. The combustion chamber 25 has two intake ports 202a and 202b, each of which has a respective intake valve 23a and 23b, which may be lifted (or opened) by movement in the downward direction, as shown in FIG. 2. In the present example, the combustion chamber 25 has just two intake ports 202a and 202b and associated intake valve 23a and 23b, but in alternative embodiments the combustion chamber 25 may have more than just two intake ports and a corresponding number of intake valves.

The intake valves 23a and 23b are opened and closed by the hydraulic system 3, which may be arranged to also operate similar intake valves of other combustion chambers of the internal combustion engine 5. The hydraulic system 3 may comprise several hydraulic subsystems 29, so that the first intake valve 23a of a combustion chamber 25 is operated by a first hydraulic subsystem 29 and the second intake valve 23b of the same combustion chamber 25 is operated by a second hydraulic subsystem 29. This provides a mechanism that enables the first intake valve to be operated independently of the second intake valve when required.

In one embodiment, each intake valve 23 of the internal combustion engine may have its own associated hydraulic subsystem. However, as will be described below, in regard to FIGS. 9 and 10A-10D, each of the hydraulic subsystems 29 may be arranged to actuate an intake valve in a first combustion chamber and another intake valve of a second combustion chamber.

The apparatus 201 also comprises the controller 9, which is configured to control the hydraulic system 3 in at least a first mode of operation and a second mode of operation. The controller 9 may comprise an electronic memory device 205 storing computer program instructions and an electronic processor 204 configured to operate in accordance with the computer program instructions to cause the hydraulic system to operate in at least the first mode and the second mode of operation.

In the first mode of operation, the controller 9 is configured to control the hydraulic system 3 to cause lifting of the first and second intake valves 23a, 23b of the first combustion chamber 25 during each intake stroke of the respective cylinder piston 27. In the second mode of operation, the controller 9 is configured to control the hydraulic system 3 to cause lifting of the first intake valve 23a of the first combustion chamber 25 during an intake stroke of the respective cylinder piston 27 and disable actuation of the second intake valve 23b of the first combustion chamber 25 during that intake stroke.

The controller 9 may be arranged to receive an input signal indicative of required engine torque from a user input device, such as the accelerator pedal 13, and select the first mode of operation in dependence on the received input signal. For example, the controller 9 may be arranged to compare the required torque to a threshold value and when the required torque is above the threshold value operate the hydraulic system in the first mode and when the required torque is below the threshold value operate it in the second mode.

In the first mode of operation, the intake valves may be opened and closed at the same time as each other, and lifted by the same distances as each other. This simultaneous opening of the intake valves 23a and 23b provides simultaneous airflows into the combustion chamber 25 through the first and second intake ports 202a and 202b. The intake ports 202a and 202b may be referred to as tumble intake ports, being configured to provide a tumble-type circulation of air in the combustion chamber 25. Consequently, in the first mode, during an intake stroke of the cylinder piston 27, when both intake ports 202a and 202b are opened simultaneously, air drawn into the combustion chamber is caused to flow in a tumble-type manner. That is, the air circulates about an axis that is substantially perpendicular to an axis 207 along which the cylinder piston 27 travels.

In high load conditions, where a relatively high level of engine torque is required, the intake valves 23a and 23b are lifted (in the first mode of operation) by a relatively long distance allowing a relatively large mass of air to be drawn into the combustion chamber 25 at relatively high rates of flow. At relatively lower load conditions, where relatively less torque is required, the intake valves 23a and 23b may be lifted (in the first mode of operation) by a relatively smaller distance and the rate at which air is drawn into the combustion chamber 25 may be lower as a consequence. This generally has the effect of reducing the energy that creates the tumble-type flow of air in the combustion chamber 25. However, in an embodiment, intake valve masking is provided around the intake valves 23a and 23b to cause an increase in speed of air entering the combustion chamber 25 in order to assist the creation of the tumble-type motion. The tumble-type circulation of air results in less fuel approaching the cylinder walls of the combustion chamber before ignition takes place, when compared to the swirl-type motion, and therefore heat loss to the cylinder walls is reduced and efficiency is increased.

Figure 3:
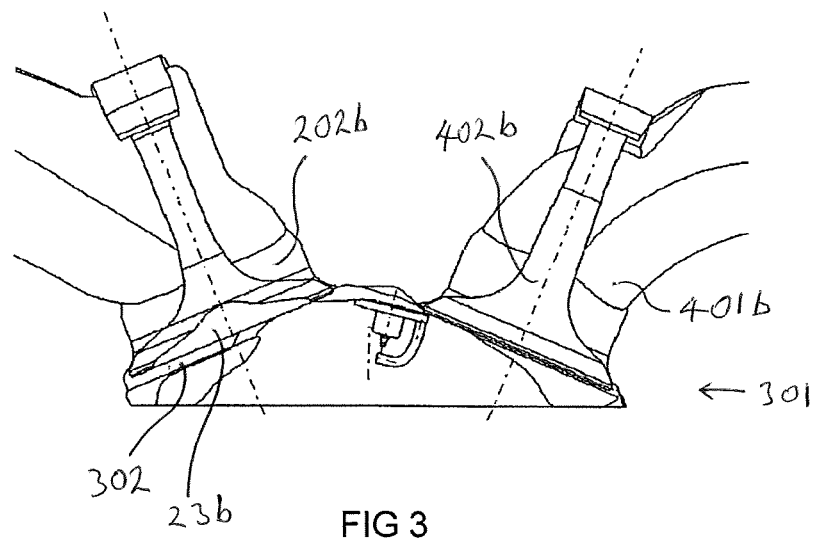
FIG. 3 shows cross-sectional side view of a cylinder head 301 having intake valve masking 302.
Figure 4:
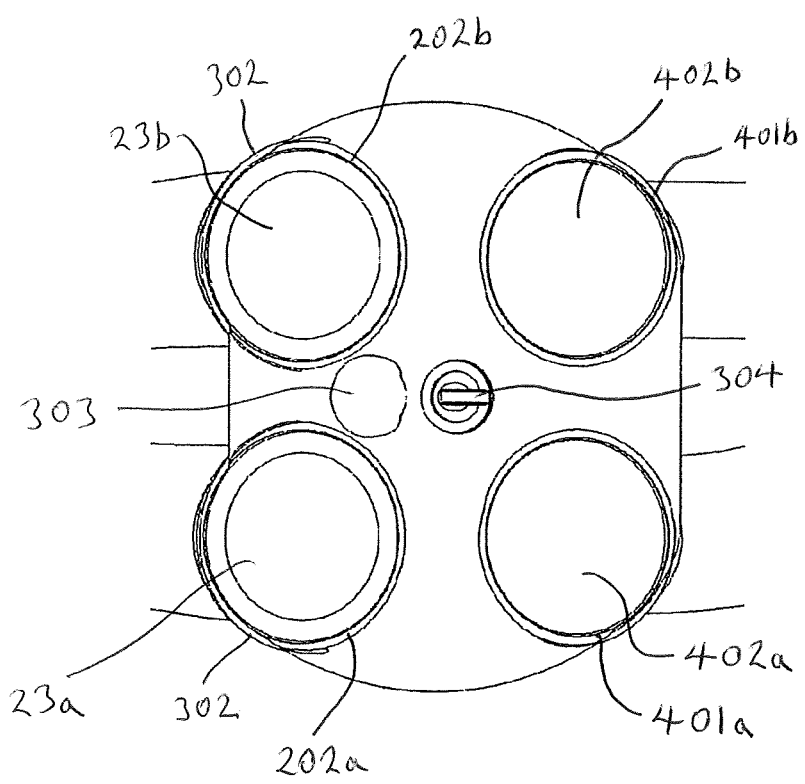
FIG. 4 shows a bottom view of the cylinder head 301 having the intake valve masking 302.

A cylinder head 301 having intake valve masking 302 is shown in the cross-sectional side view of FIG. 3 and the bottom view of FIG. 4. The intake valve masking 302 in this embodiment extends around each of the intake valves 23a and 23b for approximately 180 degrees. The masking 302 is provided by a wall of material that extends down from the surrounding surface of the cylinder head 301 around the perimeter of the intake ports 202a and 202b by about 3 mm.

The cylinder head 301 also houses the fuel injector 303 and the spark plug 304. FIGS. 3 and 4 also illustrate the positions of exhaust ports 401a and 401b with their associated exhaust valves 402a and 402b. The exhaust valves 402a and 402b may be arranged to be actuated by the hydraulic system 3 or by an alternative mechanism.

Returning to the hydraulic actuation of the intake valves 23a and 23b, in the second mode of operation, the first intake valve 23a of the first combustion chamber 25 is opened during an intake stroke of the respective cylinder piston 27 while the second intake valve 23b of the first combustion chamber 25 is not actuated during that intake stroke and therefore it remains closed. Consequently, during the intake stroke, air is drawn into the combustion chamber 25 only through the first intake port 202a. In instances where only a relatively very low torque is required, such as when the engine is idling, the controller 9 may be arranged to open the first intake port 202a for a relatively short period of time and only lift the intake valve 23a by a relatively small distance. In such a case, the resulting airflow into the combustion chamber 25 causes a circulation of air around the central axis 207 of the combustion chamber 25 in a motion that is conventionally referred to as swirl. As a consequence, fuel injected into the combustion chamber 25 generally remains in a region around the spark plug, and this provides the advantage of good combustion stability at such low engine loads.

In instances where a relatively larger torque is required, but the controller 9 is still operating in the second mode, the controller 9 may be arranged to open the first intake port 202a for a relatively longer period of time and lift the first intake valve 23a by a relatively larger distance. In such a case, the resulting airflow into the combustion chamber 25 causes a circulation of air around the central axis 207 of the combustion chamber 25, but the increased rate of downward flow of air from the first inlet port 202a also provides a tumble-type component to the air circulating the combustion chamber. That is, the axis about which the air circulates in the combustion chamber is tilted such that it is at an oblique angle to the axis 207. This motion may be referred to as "twirl", as it is a combination of swirl and tumble motions. As a consequence of this motion, fuel injected into the combustion chamber 25 is generally mixed into a larger volume of air in the combustion chamber before ignition by the spark plug 304.

Figure 5:
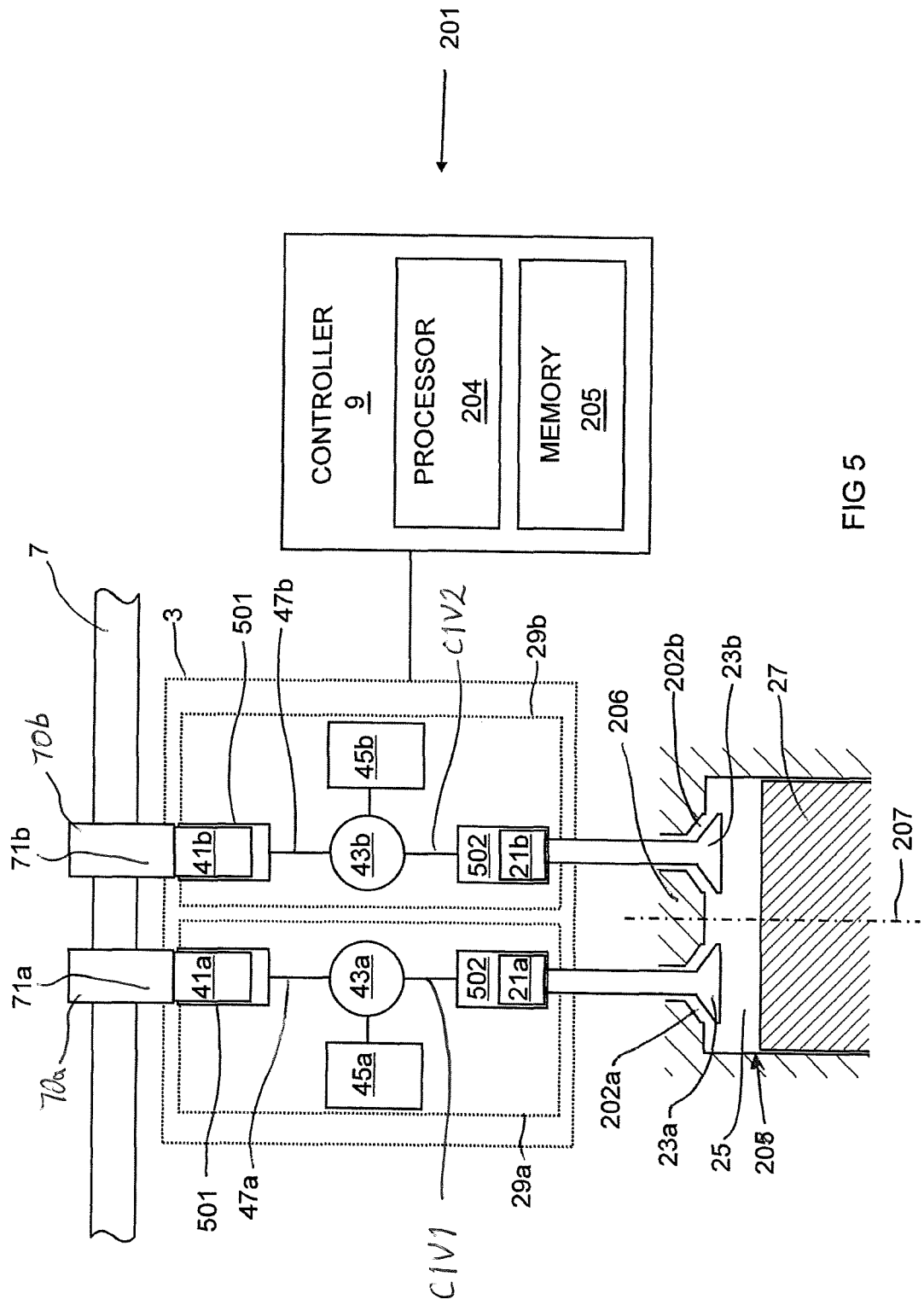
FIG. 5 shows schematically an example of the apparatus 201 of FIG. 2.

An example embodiment of the apparatus 201 of FIG. 2 is shown schematically in FIG. 5. As described above in respect of FIGS. 1 and 2, the apparatus 201 of FIG. 5 comprises a controller 9 which controls the hydraulic system 3 to actuate intake valves 23a and 23b in accordance with the first mode or the second mode of operation in dependence upon a required engine torque.

The hydraulic system 3 may be considered to comprise a first subsystem 29a for actuating the first intake valve 23a and a second subsystem 29b for actuating the second intake valve 23b. The two subsystems 29a, 29b may be similarly formed and comprise a master cylinder 501 containing a master piston 41a and 41b respectively. The camshaft 7 may be provided with cams 70a and 70b arranged to operate the respective master pistons 41a and 41b during periods that coincide with the intake strokes of the cylinder piston 27.

The master pistons 41a and 41b are each connected by a respective passage 47a and 47b to a respective valve means 43a and 43b comprising solenoid valves 43a and 43b. The solenoid valves 43a and 43b are also connected by passages C1V1 and C1V2 to respective slave cylinders 502 comprising slave pistons 21a and 21b. The slave pistons 21a and 21b are operatively connected to the intake valves 23a and 23b respectively. The solenoid valves 43a and 43b also each have a port connected to respective hydraulic accumulators 45a and 45b.

The path between the passage 47a and C1V1 may be continuously kept open or alternatively regulated by a switching mechanism as will be described below in respect of FIG. 10A.

The solenoid valve 43a is for regulating fluid passage through a port coupled directly or indirectly to the hydraulic accumulator 45a. The solenoid valve 43a of the first hydraulic subsystem 29a comprises a solenoid-operated spool (not shown), the spool being movable within an internal chamber of the solenoid valve 43a in dependence on magnitude of an electric current through the solenoid of the valve 43a. The spool is movable between a closed position blocking the port to the hydraulic accumulator 45a, and an open position opening the port to the hydraulic accumulator 45a.

During operation, when the master piston 41a is actuated by the cam 70a, hydraulic fluid is forced through passage 47a. If the solenoid valve 43a is closed, blocking flow of fluid into the accumulator 45a, the fluid acts on the slave piston 21a resulting in the intake valve 23a being lifted. If the solenoid valve 43a is opened, pressure in the passage C1V1 is reduced and hydraulic fluid flows into the accumulator 45a in preference to actuating the slave piston 21a. Therefore the intake valve 23a is caused to be in its closed position by opening of the solenoid valve 43a.

The second solenoid valve 43b may be operated in the same manner as the first solenoid valve 43a, in order to control the movement of the second intake valve 23b. Thus, the solenoid valve 43b is arranged to regulate fluid passage through a port coupled directly or indirectly to the hydraulic accumulator 45b. The solenoid valve 43b of the second hydraulic subsystem 29b comprises a solenoid-operated spool (not shown), the spool being movable within an internal chamber of the solenoid valve 43b in dependence on magnitude of an electric current through the solenoid of the valve 43b. The spool is movable between a closed position blocking the port to the hydraulic accumulator 45b, and an open position opening the port to the hydraulic accumulator 45b.

During operation, when the master piston 41b is actuated by the cam 70b, hydraulic fluid is forced through passage 47b. If the solenoid valve 43b is closed, blocking flow of fluid into the accumulator 45b, the fluid acts on the slave piston 21b resulting in the intake valve 23b being lifted. If the solenoid valve 43b is opened, pressure in the passage C1V2 is reduced and hydraulic fluid flows into the accumulator 45b in preference to actuating the slave piston 21b. Therefore the intake valve 23b is caused to be in its closed position by opening of the solenoid valve 43b.

When the hydraulic system 3 shown in FIG. 5 is in use on a vehicle 1, the vehicle 1 and internal combustion engine 5 may be adapted to house the hydraulic system 3 and supply hydraulic fluid, for example engine oil, to the hydraulic system 3, for example via a supply port (not shown) of the hydraulic system 3.

It will be understood from the above that the subsystem 29a and intake valve 23a may comprise a similar arrangement to subsystem 29b and intake valve 23b, and therefore the labels of "first" and "second" are provided for clarity of the description and either intake valve may be arranged to remain closed in the first mode of operation while the other intake valve is actuated.

The cams 70a and 70b may be provided with lobes 71a and 71b that actuate the master pistons 41a and 41b only during intake strokes of the cylinder piston 27. Therefore, movement of the intake valves is limited to periods of time during the intake strokes of the cylinder piston. In the event that the solenoid valve 43a or 43b fails to open, for example due to a fault, the intake valve 23a or 43b is opened and closed merely as determined by the action of the corresponding cam 70a or 71b on the master piston 41a or 41b. Consequently, because the timing of the cams 71a or 71b are arranged to correspond with the timing of the cylinder piston 27, there is no danger of the cylinder piston 27 coming into contact with the intake valve 23a or 23b, even in the event of failure of the solenoid valve 43a or 43b.

The solenoid valve 43a may be opened and/or closed at any times during the actuation of the master piston 41a by the cam 70a. Similarly, the solenoid valve 43b may be opened and/or closed at any times during the actuation of the master piston 41b by the cam 70b. This enables the phase of the actuation of the intake valves 23a and 23b and the time over which the intake valves are lifted to be varied and determined by signals provided to the solenoid valves 43a and 43b by the controller 9.

Figure 6A:
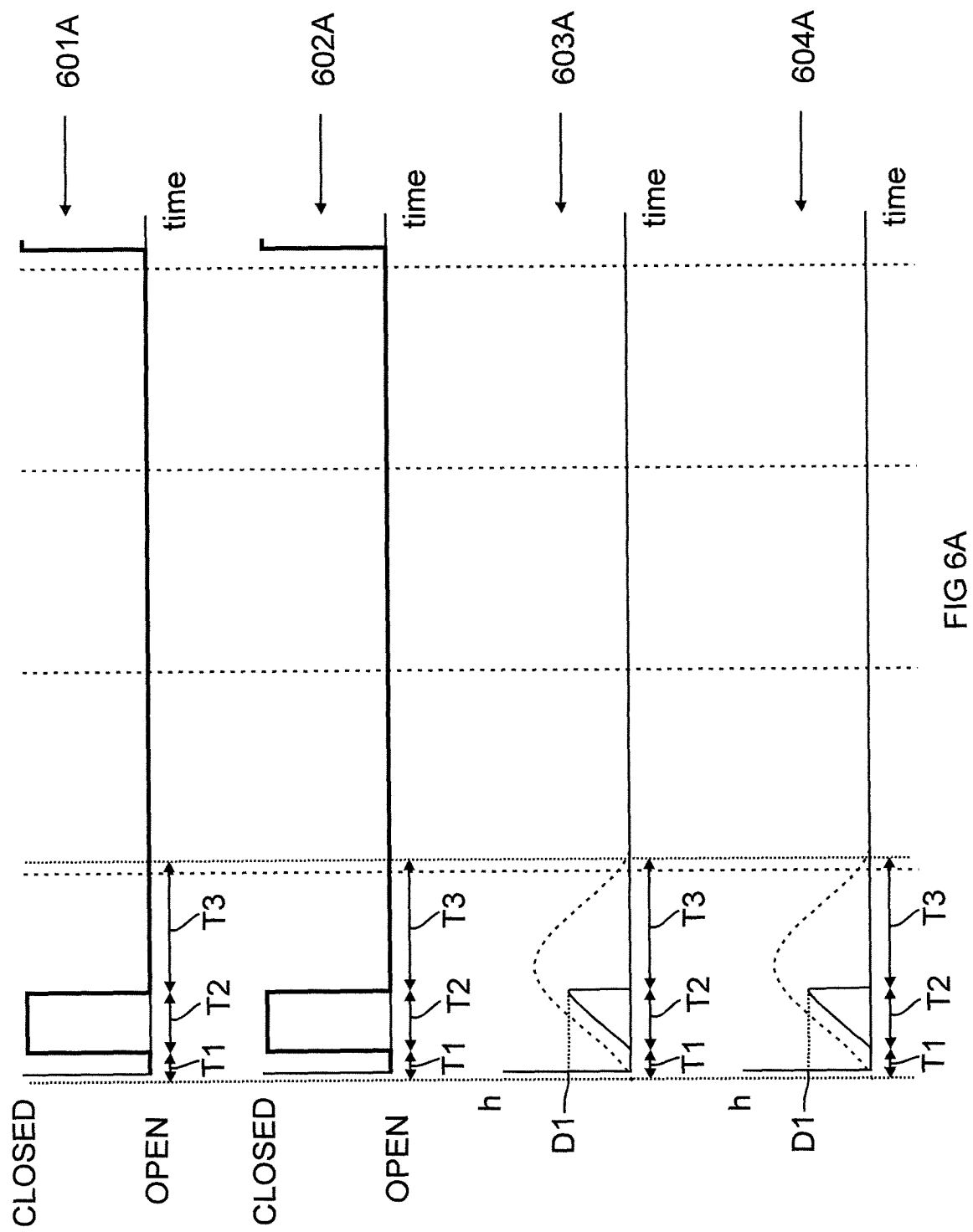
FIGS. 6A and 6B shows graphs for a first mode of operation and a second mode of operation respectively, illustrating examples of the manner in which solenoid valves 43a and 43b may be operated and the resulting lifting of intake valves 23a and 23b.
Figure 6B:
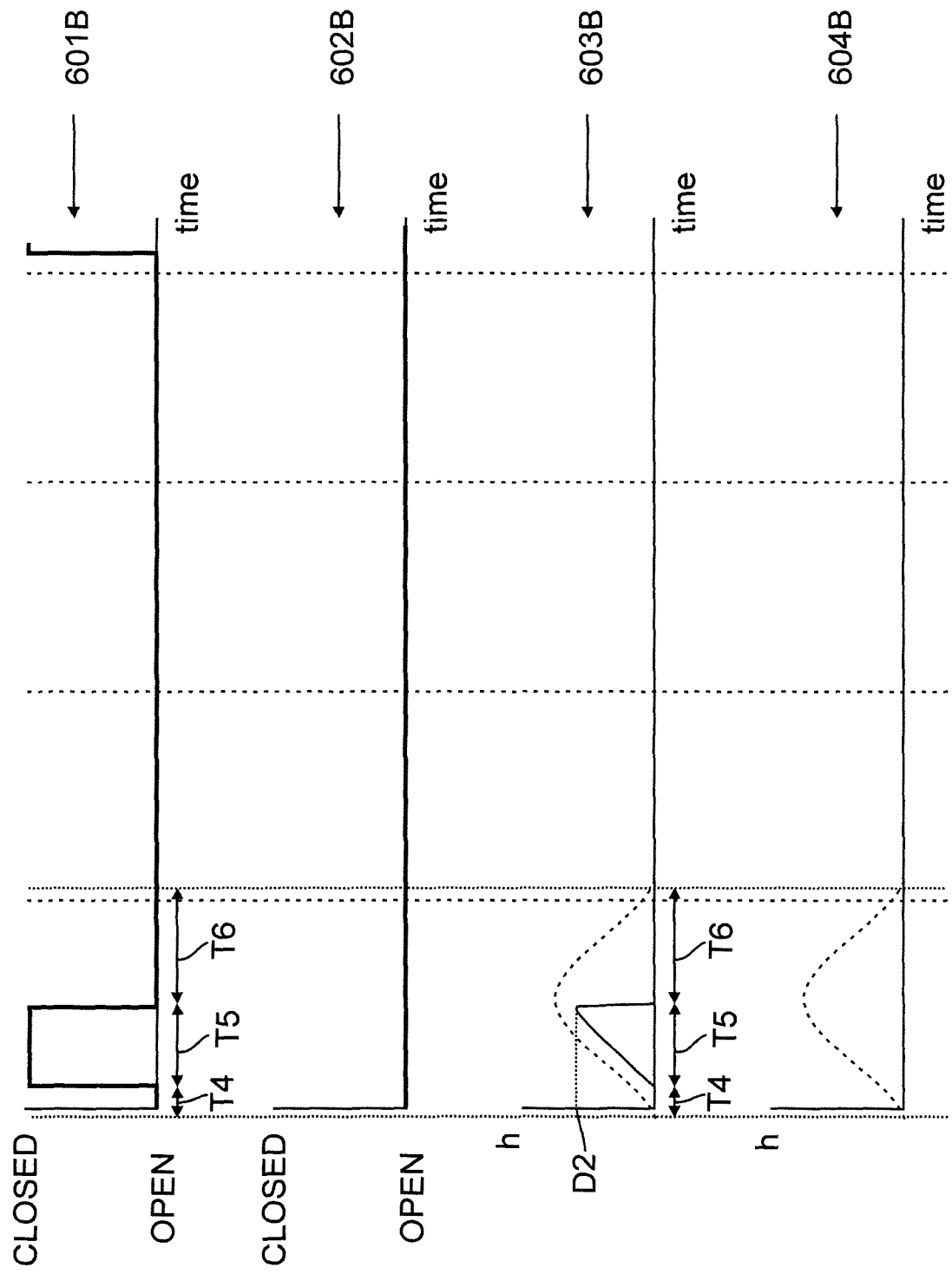

Examples of the manner in which the solenoid valves 43a and 43b may be operated and the resulting lifting of the intake valves 23a and 23b are illustrated in the graphs shown in FIGS. 6A and 6B. FIG. 6A provides an example of the first mode of operation and FIG. 6B provides an example of the second mode of operation, in which: graphs 601A and 601B illustrate movement of the solenoid valve 43a; graphs 602A and 602B illustrate movement of the solenoid valve 43b; graphs 603A and 603B illustrate movement of the intake valve 23a; and graphs 604A and 604B illustrate movement of the intake valve 23b.

The horizontal axes of the graphs 601A-604A and 601B-604B represent time. The vertical axes of graphs 601A, and 601B represent the status of the solenoid valve 43a and the vertical axes of graphs 602A, and 602B represent the status of the solenoid valve 43b. The vertical axes of graphs 603A, and 603B represent the lift height of the first intake valve 23a and the vertical axes of graphs 604A, and 604B represent the lift height of the second intake valve 23b.

The graphs 601A and 602A show an example in which the solenoid valves 43a and 43b are actuated substantially simultaneously, and therefore graphs 603A and 604A show that the intake valves 23a and 23b are actuated simultaneously. In this example, the solenoid valves 43a and 43b are held open for a first period T1 at the start of the actuation of the master pistons 41a and 41b by the cams 70a and 70b, as shown in graphs 601A and 602A. This results in the intake valves 23a and 23b remaining closed, as shown in graphs 603A and 604A. The solenoid valves 43a and 43b are then closed after the first period T1 and kept closed for a second period T2 in which the cams 70a and 70b are continuing to push on the master pistons 41a and 41b. During this second period T2 the hydraulic fluid is caused to flow through the respective passages C1V1 and C1V2 to actuate the slave pistons 21a and 21b causing the intake valves 23a and 23b to be lifted to a height D1. After this second period T2, the solenoid valves 43a and 43b are once again opened causing pressure in the passages C1V1 and C1V2 to drop by letting fluid flow into the accumulators 45a and 45b. Consequently, the intake valves 23a and 23b are closed by the opening of the solenoid valves 43a and 43b, even though the cams 70a and 70b are still acting on the master pistons 41a and 41b during a third period T3.

It may be noted that this method of actuation enables late opening of the intake valves 23a and 23b and early closing of the intake valves in a single intake stroke of the cylinder piston 27. Furthermore, the timing of the opening and closing of the intake valves is determined by the control signals provided to the solenoid valves 43a and 43b, and so the timing of the opening and the closing of the intake valves may be chosen independently of each other.

With regard to FIG. 6B, graphs 601B and 602B show an example in which the solenoid valve 43a is actuated in a similar manner as described above in regard to FIG. 6A but the solenoid valve 43b is held open continuously, resulting in the intake valve 23b remaining closed as illustrated by graph 604B. In this example, the solenoid valve 43a is held open for a first period T4 at the start of the actuation of the master pistons 41a by the cam 70a, as shown in graphs 602B. This results in the intake valve 23a remaining closed for a first period T4, as shown in graph 603B. The solenoid valve 43a is then closed after the first period T4 and kept closed for a second period T5 in which the cam 70a is continuing to push on the master piston 41a. During this second period T5 the hydraulic fluid is caused to flow through the passage C1V1 to actuate the slave piston 21a causing the intake valve 23a to be lifted to a height D2. After this second period T5, the solenoid valve 43a is once again opened causing pressure in the passage C1V1 to drop by letting fluid flow into the accumulator 45a. Consequently, the intake valve 23a is closed by the opening of the solenoid valve 43a, even though the cam 70a still acts on the master piston 41a for a third period T6.

The second periods T2 and T5, during which one or both of the intake valves 23a and 23b are lifted, may be varied in dependence of the torque that the engine is required to produce. As the torque requirement increases, the periods T2 and T5 may be increased to enable a greater mass of air to enter the combustion chamber 25. Also, as described above, the manner in which the air circulates around the combustion chamber 25 may change from a swirl to a combination of swirl and tumble as the period T5 is increased.

During operation of the vehicle, depending upon the required torque, the apparatus 201 may switch from the first mode of operation to the second mode of operation. This may be achieved during consecutive intake strokes of the cylinder piston 27 by the controller 9 providing the necessary signal to the solenoid valve 43b during one intake stroke to close and on the next intake stroke to remain open. Similarly, the apparatus 201 may switch from the second mode of operation to the first mode of operation during consecutive intake strokes of the cylinder piston 27 by the controller 9 providing the necessary signal to the solenoid valve 43b during one intake stroke to remain open and on the next intake stroke to close.

During such a change in mode, the period over which the first solenoid valve 43a is closed may be changed. For example, during an intake stroke where only the first intake valve 23a is lifted, it may be lifted for a period T5 and by a distance D2 as shown in FIG. 6B, and during the subsequent intake stroke where both intake valves 23a and 23b are lifted, they may be lifted for a shorter period T2 and up to a smaller distance D1 as shown in FIG. 6A. In this way, for example, the mass of the air that is drawn into the combustion chamber during an intake stroke in one mode of operation may be arranged to be substantially the same as the mass the air that is drawn into the combustion chamber during the previous intake stroke in the other mode of operation.

Also during such a change in mode of operation, during consecutive intake strokes of the cylinder piston 27 the controller 9 may provide the necessary signals to the solenoid valve 43b during one intake stroke to close and open it simultaneously with the solenoid valve 43a and on the next intake stroke cause it to remain open. Consequently, the air circulation in the combustion chamber 25 is tumble-type circulation during one intake stroke (when both valves are actuated simultaneously) and a combination of swirl and tumble-type circulation when only one valve is actuated. Similarly, the apparatus 201 may switch from the second mode of operation, where one valve is open and a combination of swirl and tumble-type circulation is present in a combustion chamber during an intake stroke of the cylinder piston 27, to the first mode of operation, so that on the following intake stroke the solenoid valves 43a and 43b are opened simultaneously to provide tumble-type circulation.

Figure 7:
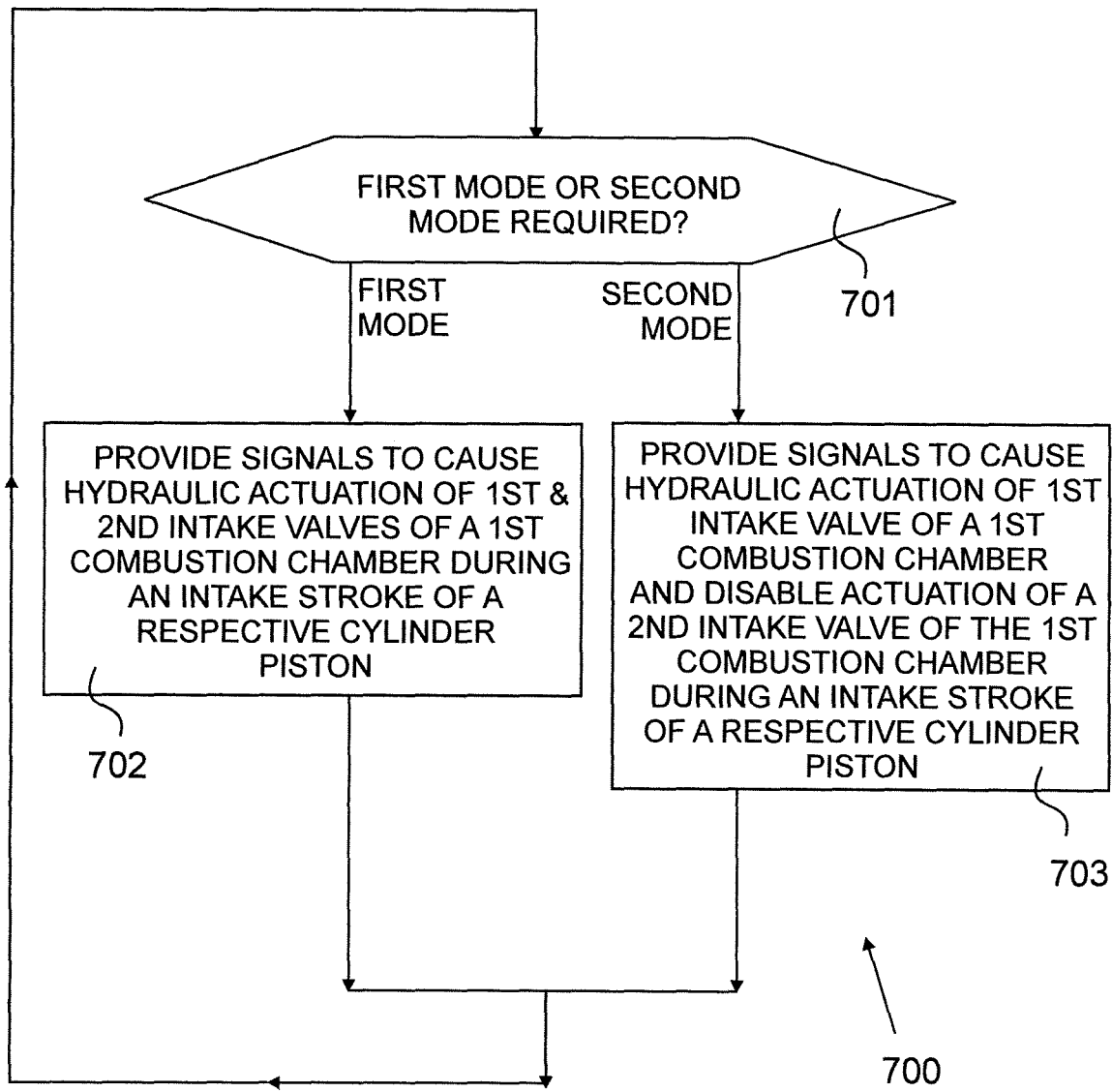
FIG. 7 shows a flowchart outlining a method 700 of controlling intake valves 23 in an internal combustion engine 5, in which each combustion chamber has a respective cylinder piston and at least a first and second intake valves.

A flowchart outlining a method 700 of controlling intake valves 23 in an internal combustion engine 5, in which each combustion chamber has a respective cylinder piston and at least a first intake valve and a second intake valve, is shown in FIG. 7. At block 701 it is determined whether the first mode of operation or the second mode of operation is required. When the engine is required to provide a relatively large magnitude of torque, the first mode may be selected at block 701, and the second mode may be selected when relatively smaller torque values are required. The process at block 701 may comprise comparing the required torque to a threshold value and when it is larger than the threshold value, selecting the first mode.

When the first mode is selected, the first and second valves (such as 23a and 23b) of the first combustion chamber 25 are caused to be actuated during an intake stroke of the respective cylinder piston 27, at block 702. In an embodiment, the first and second valves of each combustion chamber of the internal combustion engine 5 are caused to be actuated during an intake stroke of the respective cylinder piston 27, at block 702.

Alternatively, when the second mode is selected at block 701, the first intake valve 23a of the first combustion chamber 25 is caused to be hydraulically actuated at block 703 and actuation of the second intake valve 23b of the first combustion chamber 25 is disabled during each intake stroke of the respective cylinder piston. In an embodiment, the first intake valve 23 of each combustion chamber of the internal combustion engine 5 is hydraulically actuated at block 703 and actuation of the second intake valve 23 of each said combustion chamber 25 is disabled during each intake stroke of the respective cylinder piston.

Following the process at block 702 or 703 the process at block 701 is repeated. In this way, the process of method 700 cycles repeatedly though block 701, each time being followed by block 702 or block 703 as determined at block 701.

Figure 8:
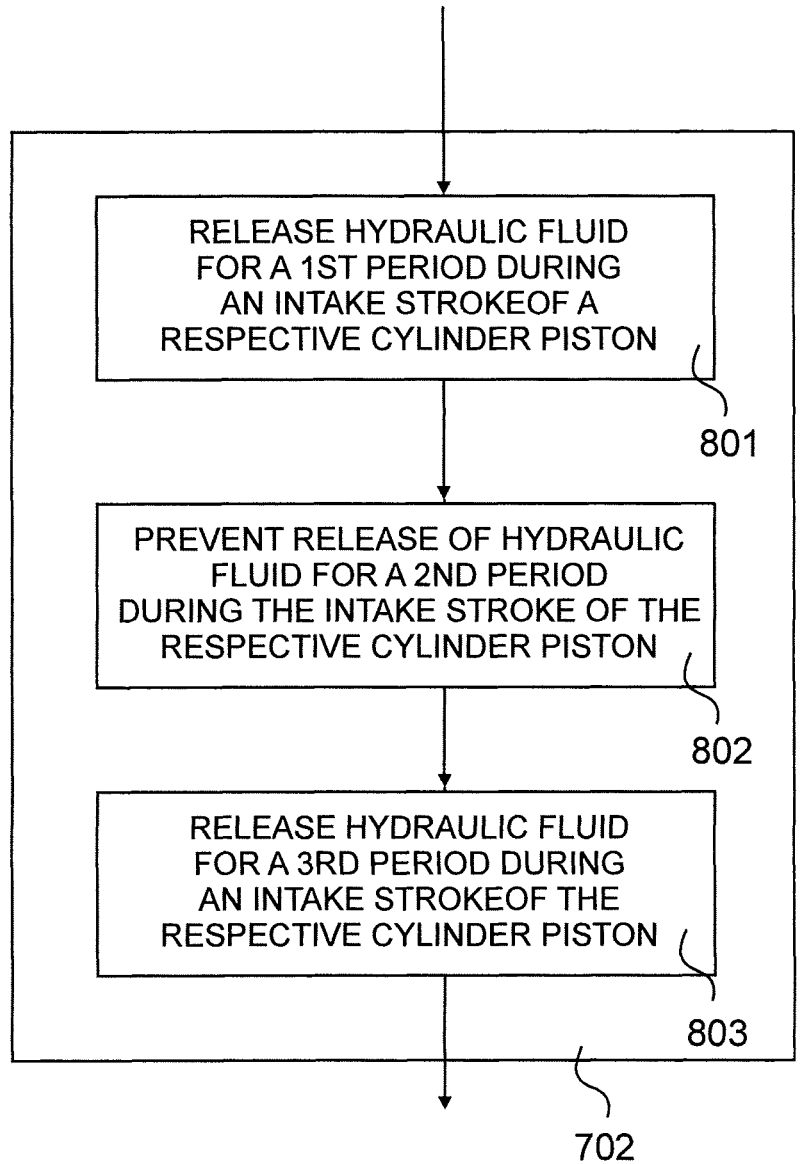
FIG. 8 shows a flowchart illustrating examples of the processes performed at block 702 of FIG. 7.

Examples of the processes performed at block 702 are shown in the flowchart of FIG. 8. It may be noted that the processes illustrated in FIG. 8 are performed in respect of each combustion chamber 25 of the internal combustion engine 5, during the period in which the intake valves for the combustion chamber are actuatable, i.e. during the period in which the corresponding master pistons 41 of the hydraulic system 3 are actuated by the camshaft 7. At block 801, hydraulic fluid is released by means such as the solenoid valves 43 into one or more accumulators 45 during an intake stroke of a respective piston cylinder. Consequently, the respective intake valves remain closed. At block 802 release of the hydraulic fluid is prevented so that hydraulic pressure causes lifting of the respective intake valves during the same intake stroke. At block 803 the hydraulic fluid is again released during the same intake stroke of the cylinder piston, and so the intake valves are caused to close.

By this process, the intake valves may be opened as illustrated by the graphs of FIG. 6A. However, it should be noted that the first, second and third periods may be varied in duration and either the process at block 801 or the process at block 803 may be omitted dependent upon signals provided by the controller 9 to the hydraulic system 3.

As discussed above, in embodiments, the internal combustion engine 5 has multiple combustion chambers 25 having at least two intake valves 23 in which one intake valve 23 is operated by a hydraulic subsystem 29 and another intake valve 23 is operated by a different hydraulic subsystem 29. In an embodiment, each of the hydraulic subsystems 29 is arranged to operate just one valve. However, in the embodiments described below, each hydraulic subsystem 29 is arranged to operate an intake valve 23 of one combustion chamber 25 and an intake valve 23 of another combustion chamber 25.

Figure 9:
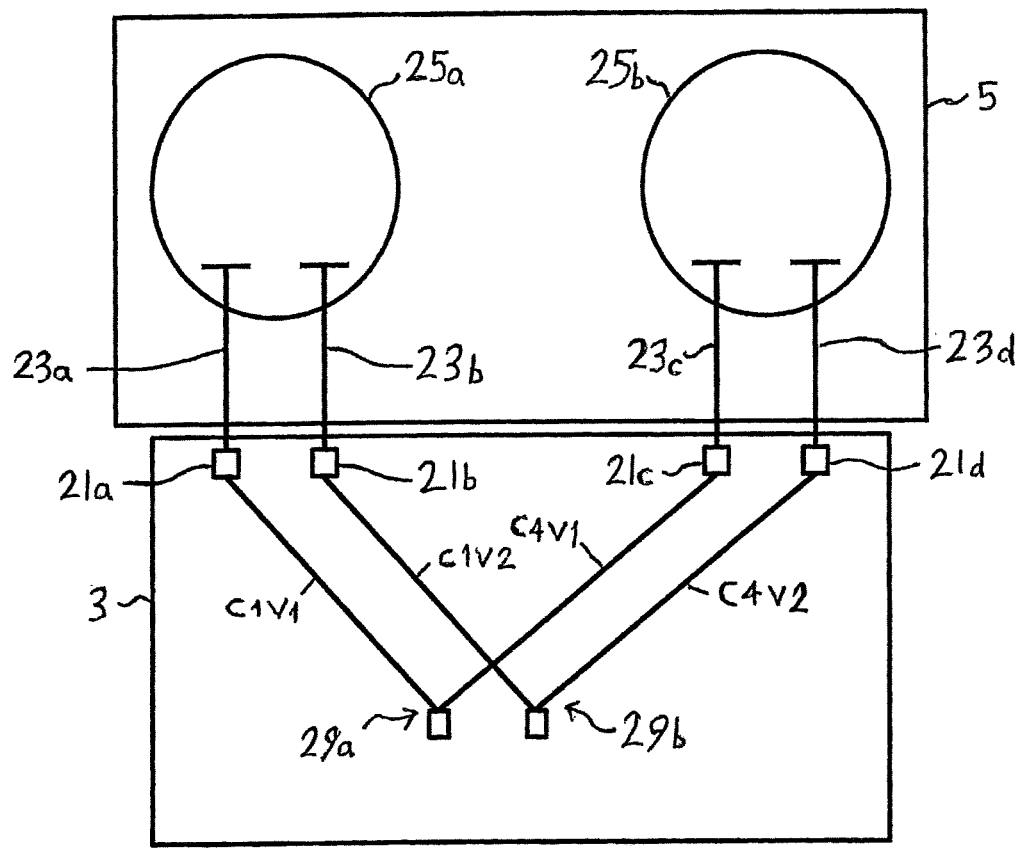
FIG. 9 shows a simplified diagram illustrating an example of an hydraulic system 3 for controlling valve lifts of intake valves (or inlet poppet valves) 23a-23d of combustion chambers of a multi-cylinder internal combustion engine 5.

FIG. 9 is a simplified diagram illustrating an example of an hydraulic system 3 for controlling valve lifts of intake valves (or inlet poppet valves) 23a-23d of combustion chambers of a multi-cylinder internal combustion engine 5, the hydraulic system 3 comprising at least: a first slave piston 21a, arranged to control a lift of a first intake valve 23a of a first combustion chamber 25a; a second slave piston 21b, arranged to control a lift of a second intake valve 23b of the first combustion chamber 25a; a third slave piston 21c, arranged to control a lift of a first intake valve 23c of a second combustion chamber 25b; a fourth slave piston 21d, arranged to control a lift of a second intake valve 23d of the second combustion chamber 25b; a first hydraulic subsystem 29a arranged to operate, at different times, the first slave piston 21a and the third slave piston 21c, but not the second slave piston 21b and the fourth slave piston 21d; and a second hydraulic subsystem 29b arranged to operate, at different times, the second slave piston 21b and the fourth slave piston 21d, but not the first slave piston 21a and the third slave piston 21c.

The first slave piston 21a, second slave piston 21b, third slave piston 21c and fourth slave piston 21d are arranged to move, pushing their respective intake valves 23a-23d in dependence upon application of fluid displacement via a hydraulic subsystem 29. Pushing is achieved for example via surface-to-surface contact between each slave piston 21a-21d and valve stems of the associated intake valves 23a-23d. In other examples the intake valves 23a-23d and pistons 21a-21d may be integrally formed, or mechanically coupled via intervening elements.

In the example of FIG. 9, the first hydraulic subsystem 29a comprises passages C1V1, C4V1 leading to the first slave piston 21a and the third slave piston 21c respectively, but not to the second slave piston 21b and the fourth slave piston 21d. The second hydraulic subsystem 29b comprises passages C1V2 and C4V2 leading to the second slave piston 21b and the fourth slave piston 21d respectively, but not to the first slave piston 21a or the third slave piston 21c.

Fluid displacement changes in the respective hydraulic subsystems 29a, 29b, through the passages C1V1, C1V2, C4V1, C4V2, operate the respective slave pistons 21a-21d by causing them to move at required times. The resulting slave piston movement causes movement of a respective intake valve 23a-23d.

The first hydraulic subsystem 29a may be a first hydraulic circuit arranged to control its internal hydraulic fluid displacement in a continuously variable manner. The second hydraulic subsystem 29b may be a second hydraulic circuit independent from the first hydraulic circuit, for separately controlling its internal hydraulic fluid displacement in a continuously variable manner.

According to some, but not necessarily all examples, the first hydraulic subsystem 29a is arranged to operate, at different times, only the first slave piston 21a and only the third slave piston 21c. The second hydraulic subsystem 29b is arranged to operate, at different times, only the second slave piston 21b, and only the fourth slave piston 21d.

As described above in relation to FIG. 9, the hydraulic system 3 comprises only half the number of hydraulic subsystems 29a, 29b relative to the number of intake valves 23a-23d to be controlled. Further, each of the intake valves 23a, 23b of the first combustion chamber 25a is operated by means of a separate hydraulic subsystem, enabling continuously variable lifting of the intake valves 23a, 23b of the first combustion chamber 25a to be performed substantially independently of one another. Similarly, each of the intake valves 23c, 23d of the second combustion chamber 25b is operated by means of a separate hydraulic subsystem, enabling continuously variable lifting of the intake valves 23c, 23d of the second combustion chamber 25b to be performed substantially independently of one another.

Figure 10A:
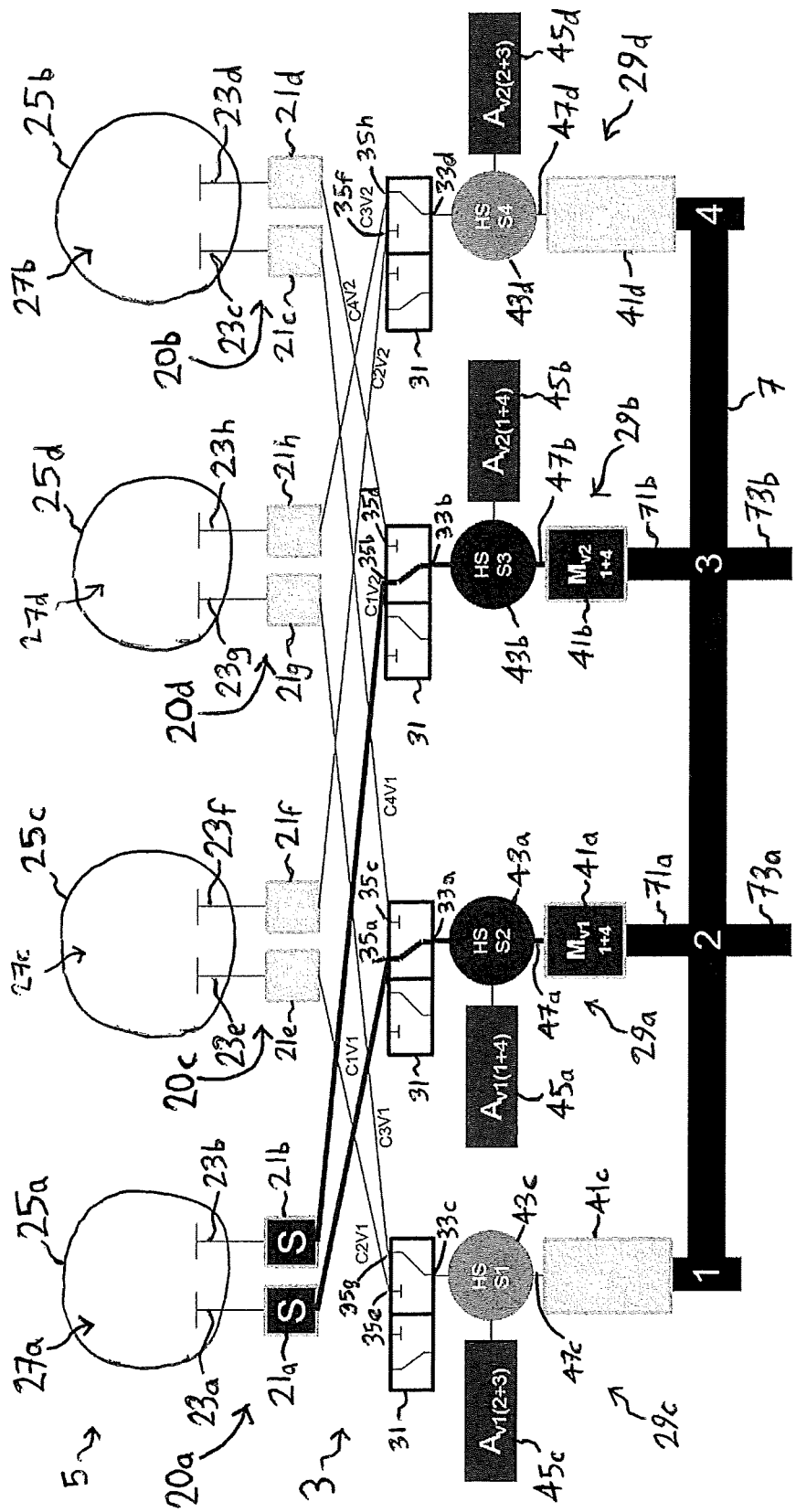
FIG. 10A illustrates another example of the hydraulic system 3, based upon the simplified hydraulic system 3 described above in relation to FIG. 9.

FIG. 10A illustrates another example of the hydraulic system 3, based upon the simplified hydraulic system 3 described above in relation to FIG. 9.

FIG. 10A illustrates the hydraulic system 3, a camshaft 7 and a four-cylinder four-stroke internal combustion engine 5. The hydraulic system 3 is illustrated using at least some hydraulic circuit diagram symbols. The internal combustion engine 5 is illustrated in cross-section through a point between top dead centre and bottom dead centre. Intake valves 23a-23h are illustrated intersecting the combustion chambers 25a-25d, however they would in fact be positioned above top dead centre. The camshaft 7 is illustrated in cross-section along its axial length, with lobes extending radially at right angles to its axial length.

As shown in FIG. 10A, the internal combustion engine 5 comprises a first combustion chamber 25a and a second combustion chamber 25b, as described above in relation to FIG. 9, and further a third combustion chamber 25c and a fourth combustion chamber 25d.

A first set 20a of intake valves for the first combustion chamber 25a comprises a first intake valve 23a and a second intake valve 23b. A second set 20b of intake valves for the second combustion chamber 25b comprises a first intake valve 23c and a second intake valve 23d. A third set 20c of intake valves for the third combustion chamber 25c comprises a first intake valve 23e and a second intake valve 23f. A fourth set 20d of intake valves for the fourth combustion chamber 25d comprises a first intake valve 23g and a second intake valve 23h.

FIGS. 10A-10D illustrate use of the hydraulic system 3 at four different times within a four-stroke combustion cycle, the internal combustion engine 5 having a firing order of 25b-25c-25a-25d.

FIG. 10A represents a particular point in time within a four-stroke combustion cycle. A cylinder piston 27a of the first combustion chamber 25a is performing its intake stroke. A cylinder piston 27b of the second combustion chamber 25b is performing its combustion stroke. A cylinder piston 27c of the third combustion chamber 25c is performing its compression stroke. A cylinder piston 27d of the fourth combustion chamber 25d is performing its exhaust stroke.

In the example of FIG. 10A, the hydraulic system 3 comprises a first hydraulic subsystem 29a, a second hydraulic subsystem 29b, a third hydraulic subsystem 29c, and a fourth hydraulic subsystem 29d. Each hydraulic subsystem 29a-29d is filled with substantially incompressible hydraulic fluid and is an independent hydraulic circuit arranged to control its internal hydraulic fluid displacement in a continuously variable manner.

The first hydraulic subsystem 29a of FIG. 10A comprises a master piston 41a for actuation by a camshaft 7. Actuation of the master piston 41a comprises pushing the master piston 41a inside a small cylinder (not shown), following a path corresponding to a circumferential profile of a camshaft 7 cam having one or more or lobes. The camshaft 7 illustrated in FIG. 10A comprises a first cam having a first pair of lobes 71a, 73a, separated azimuthally by 180 degrees. The first lobes 71a, 73a are at a same axial location along the camshaft 7 to align with the master piston 41a of the first hydraulic subsystem 29a, and have maximum lifts associated therewith for pushing the master piston 41a. As there are two lobes, the camshaft 7 is shaped to push the master piston 41a twice per revolution of the camshaft 7.

The first hydraulic subsystem 29a of FIG. 10A further comprises valve means 43a comprising a solenoid valve 43a and hydraulic accumulator 45a. A passage 47a extends between the master piston 41a and a port of the solenoid valve 43a. The solenoid valve 43a is for regulating fluid passage through a port coupled directly or indirectly to the hydraulic accumulator 45a.

The solenoid valve 43a of the first hydraulic subsystem 29a comprises a solenoid-operated spool (not shown), the spool being movable within an internal chamber of the solenoid valve 43a in dependence on an electric current magnitude through the solenoid. The spool is movable between a closed position blocking the port to the hydraulic accumulator 45a, and an open position opening the port to the hydraulic accumulator 45a, or intermediate positions therebetween. The solenoid valve 43a comprises at least one port coupled directly or indirectly to two passages: a passage C1V1 extending towards the first intake valve 23a of the first combustion chamber 25a, and a passage C4V1 extending towards the first intake valve 23c of the second combustion chamber 25b.

The passage C1V1 terminates at a first slave piston 21a for controlling a lift of the first intake valve 23a of the first combustion chamber 25a. The passage C4V1 terminates at a third slave piston 21c for controlling a lift of the first intake valve 23c of the second combustion chamber 25b.

Figure 10B:
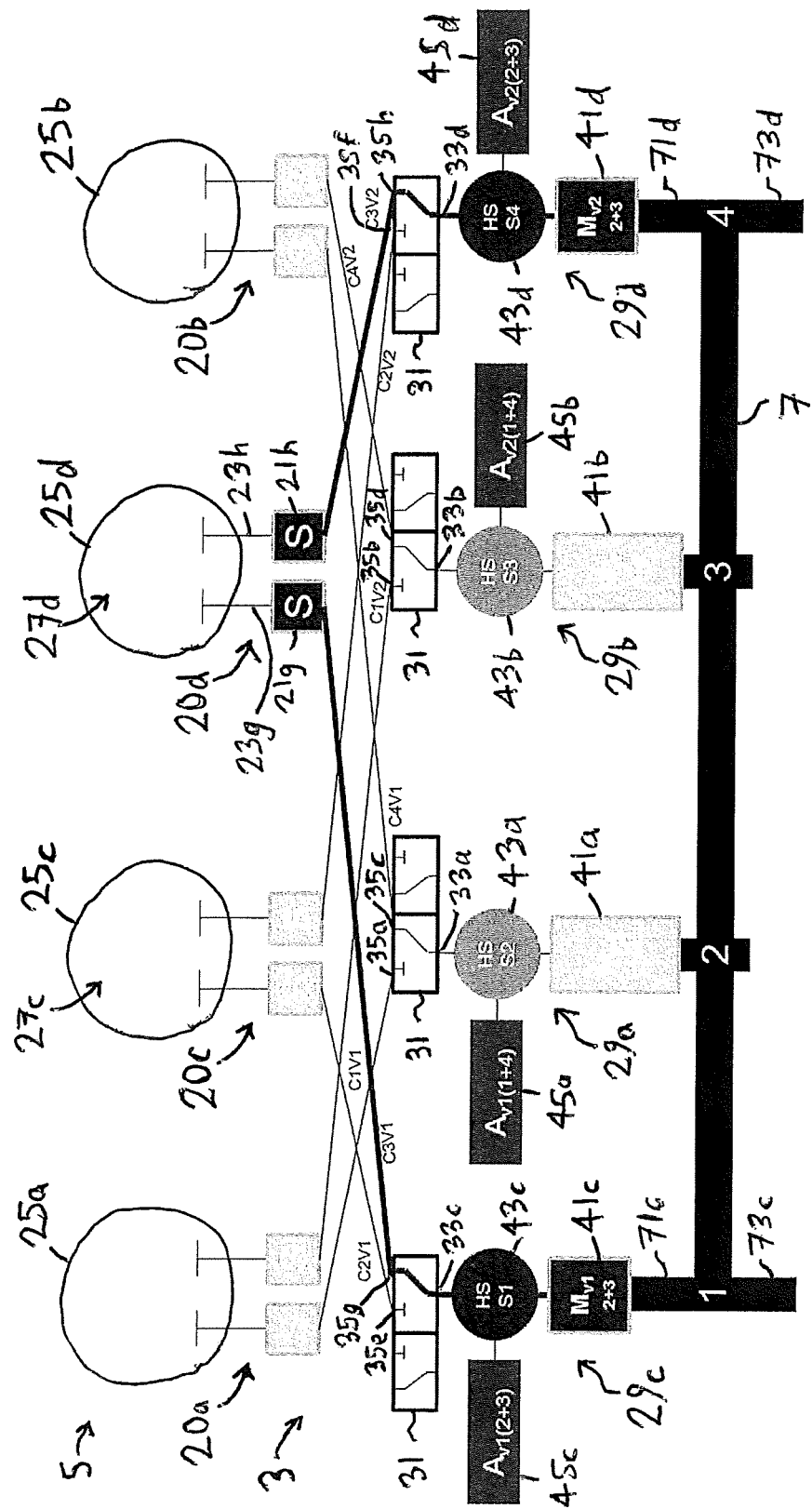
FIGS. 10B-10D show the hydraulic system 3 of FIG. 10A, at three different times within a four-stroke combustion cycle, the internal combustion engine 5 having a firing order of 25b-25c-25a-25d.

The second, third and fourth hydraulic subsystems 29b, 29c and 29d of FIG. 10A are configured in a similar way to the first hydraulic subsystem 29a. Thus, each of the hydraulic subsystems 29a, 29b, 29c and 29d comprise respective master pistons 41a, 41b, 41c and 41d for actuation by the camshaft 7. Actuation of each master piston 41a, 41b, 41c and 41d comprises moving the master piston 41a, 41b, 41c and 41d inside a small cylinder (not shown), following a path corresponding to a circumferential profile of a camshaft 7 lobe or lobes. The camshaft 7 illustrated in FIG. 10A comprises a cam having respective pair of lobes separated azimuthally by 180 degrees for each of the master pistons 41a, 41b, 41c and 41d. Thus, the second lobes 71b, 73b are at a same axial location along the camshaft 7 to align with the master piston 41b of the second hydraulic subsystem 29b, and have maximum lifts associated therewith for pushing the master piston 41b. With reference to FIG. 10B, the camshaft 7 comprises a third pair of lobes 71c, 73c, separated azimuthally from each other by 180 degrees and a fourth pair of lobes 71d, 73d, separated azimuthally from each other by 180 degrees.

The third lobes 71c, 73c and the fourth lobes 71d, 73d are not visible in the illustration of FIG. 10A because they are azimuthally perpendicular to the first lobes 71a, 73a and second lobes 71b, 73b on the camshaft 7, and therefore radially extend perpendicular to the plane of the cross-section at the time represented in FIG. 10A. The third lobes 71c, 73c are at a same axial location along the camshaft 7 to align with the master piston 41c of the third hydraulic subsystem 29c, and have maximum lifts associated therewith for pushing the master piston 41c. The fourth lobes 71d, 73d are at a same axial location along the camshaft 7 to align with the master piston 41d of the fourth hydraulic subsystem 29d, and have maximum lifts associated therewith for pushing the master piston 41d.

As there are two lobes aligned with each master piston 41, the camshaft 7 is shaped to push the master piston 41 twice per revolution of the camshaft 7.

Each of the hydraulic subsystems 29a, 29b, 29c and 29d of FIG. 10A further comprises a respective solenoid valve 43a, 43b, 43c and 43d and corresponding hydraulic accumulator 45a, 45b, 45c and 45d. A respective passage 47a, 47b, 47c, 47d extends between each master piston 41a, 41b, 41c, 41d and a port of the respective solenoid valve 43a, 43b, 43c, 43d. The solenoid valves 43a, 43b, 43c and 43d are for regulating fluid passage through a port coupled directly or indirectly to the respective hydraulic accumulator 45a, 45b, 45c and 45d.

Each solenoid valve 43a, 43b, 43c and 43d of the hydraulic subsystems 29a, 29b, 29c and 29d comprises a solenoid-operated spool (not shown), the spool being movable within an internal chamber of the solenoid valve 43a, 43b, 43c and 43d in dependence on an electric current magnitude through the solenoid. The spool is movable between a closed position blocking the port to the respective hydraulic accumulator 45a, 45b, 45c and 45d, and an open position opening the port to the respective hydraulic accumulator 45a, 45b, 45c and 45d, or intermediate positions therebetween. Each solenoid valve 43a, 43b, 43c and 43d comprises at least one port coupled directly or indirectly to two passages.

Thus, the second solenoid valve 43b comprises at least one port coupled directly or indirectly to two passages: a passage C1V2 extending towards the second intake valve 23b of the first combustion chamber 25a, and a passage C4V2 extending towards the second intake valve 23d of the second combustion chamber 25b. The passage C1V2 terminates at the second slave piston 21b for controlling a lift of the second intake valve 23b of the first combustion chamber 25a. The passage C4V2 terminates at a fourth slave piston 21d for controlling a lift of the second intake valve 23d of the second combustion chamber 25b.

Similarly, the third solenoid valve 43c comprises at least one port coupled directly or indirectly to two passages: a passage C2V1 extending towards the first intake valve 23e of the third combustion chamber 25c, and a passage C3V1 extending towards the first intake valve 23g of the fourth combustion chamber 25d. The passage C2V1 terminates at a fifth slave piston 21e for controlling a lift of the first intake valve 23e of the third combustion chamber 25c. The passage C3V1 terminates at a seventh slave piston 21g for controlling a lift of the first intake valve 23g of the fourth combustion chamber 25d.

Similarly, the fourth solenoid valve 43d comprises at least one port coupled directly or indirectly to two passages: a passage C2V2 extending towards the second intake valve 23f of the third combustion chamber 25c, and a passage C3V2 extending towards the second intake valve 23h of the fourth combustion chamber 25d. The passage C2V2 terminates at a sixth slave piston 21f for controlling a lift of the second intake valve 23f of the third combustion chamber 25c. The passage C3V2 terminates at an eighth slave piston 21h for controlling a lift of the second intake valve 23h of the fourth combustion chamber 25d.

Any number of intervening elements may be provided between each master piston 41a-41d and its respective camshaft lobe or lobes, such as pushrods, rocker arms, roller finger followers, tappets etc.

The hydraulic system 3 of FIG. 10A further comprises switching means 31, in the form of directional control valves 31. Each hydraulic subsystem 29a-29d is associated with a single directional control valve 31, which may be a spool valve 31.

A spool valve 31 of the first hydraulic subsystem 29a comprises an inlet port 33a coupled directly or indirectly to a port of solenoid valve 43a, an outlet port 35a coupled to passage C1V1, and an outlet port 35c coupled to passage C4V1.

The switching means 31 of the first hydraulic subsystem 29a, in this example spool valve 31, may have two switching states. In a first switching state, shown in FIG. 10A, fluid passage through the outlet port 35c is blocked and fluid passage through the outlet port 35a is unblocked. Consequently the hydraulic circuit between master piston 41a and first slave piston 21a is closed circuit so that the first slave piston 21a can be caused to be moved in dependence on application of fluid displacement by the master piston 41a. The hydraulic circuit between master piston 41a and the third slave piston 21c is open circuit so that the third slave piston 21c cannot be caused to be moved in dependence on application of fluid displacement by the master piston 41a.

Figure 10C:
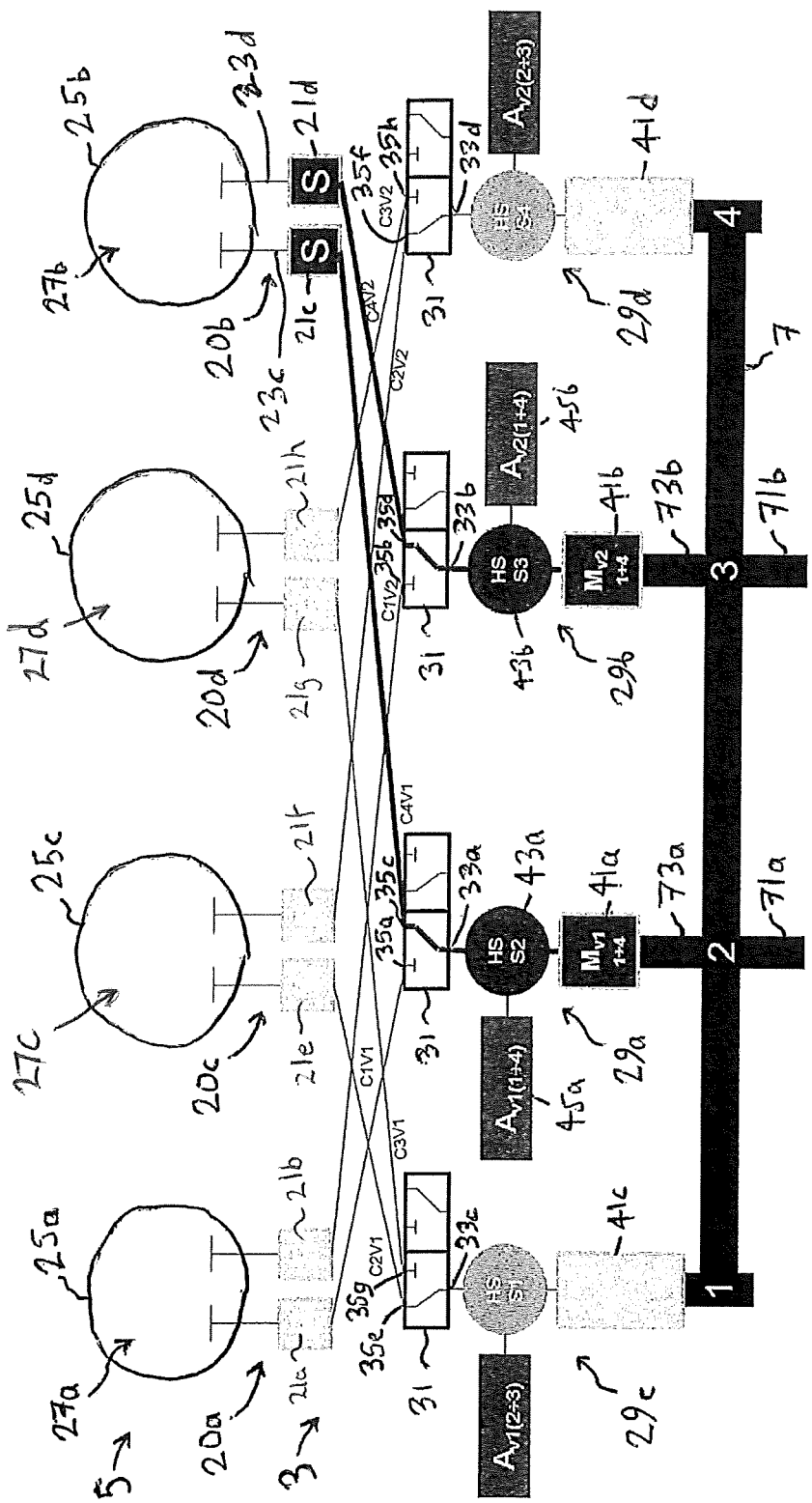

In a second switching state, shown for example in FIG. 10C, fluid passage through the outlet port 35a is blocked and fluid passage through the outlet port 35c is unblocked. Consequently the hydraulic circuit between master piston 41a and third slave piston 21c is closed circuit so that the third slave piston 21c can be caused to be moved in dependence on application of fluid displacement by the master piston 41a. The hydraulic circuit between master piston 41a and the first slave piston 21a is open circuit so that the first slave piston 21a cannot be caused to be moved in dependence on application of fluid displacement by the master piston 41a.

The switching means 31 of each hydraulic subsystem 29a, 29b, 29c, 29d, in this example the spool valves 31, may each have two switching states. In the first switching state, shown in FIG. 10A, fluid passage through an outlet port 35c, 35d, 35e, 35f of each of the switching means 31 is blocked, and fluid passage through another outlet port 35a, 35b, 35g, 35h of each of the switching means is unblocked. Consequently the hydraulic circuit between master pistons 41a, 41b, 41c and 41*d* and respective second slave pistons 21*a*, 21*b*, 21*g* and 21*h* is closed circuit so that the second slave piston 21*a*, 21*b*, 21*g* and 21*h* can be caused to be moved in dependence on application of fluid displacement by the respective master piston 41*a*, 41*b*, 41*c* and 41*d*. The hydraulic circuits between master pistons 41*a*, 41*b*, 41*c* and 41*d* and the slave pistons 21*c*, 21*d*, 21*e*, 21*g* are open circuit so that the slave piston 21*c*, 21*d*, 21*e*, 21*g* cannot be caused to be moved in dependence on application of fluid displacement by the master piston 41*a*, 41*b*, 41*c* and 41*d*.

In the second switching state, shown for example in FIG. 10O, fluid passage through the outlet ports 35*a*, 35*b*, 35*g*, 35*h* of the switching means 31 is blocked and fluid passage through the outlet ports 35*c*, 35*d*, 35*e*, 35*f* is unblocked. Consequently the hydraulic circuits between each of the master pistons 41*a*, 41*b*, 41*c* and 41*d* and the respective slave piston 21*c*, 21*d*, 21*e*, 21*f* is closed circuit so that the slave pistons 21*c*, 21*d*, 21*e*, 21*f* can be caused to be moved in dependence on application of fluid displacement by the master piston 41*a*, 41*b*, 41*c* and 41*d*. The hydraulic circuits between master pistons 41*a*, 41*b*, 41*c* and 41*d* and the slave piston 21*a*, 21*b*, 21*g* and 21*h* are open circuit so that the slave pistons 21*a*, 21*b*, 21*g* and 21*h* cannot be caused to be moved in dependence on application of fluid displacement by the master piston 41*a*, 41*b*, 41*c* and 41*d*.

Therefore, a first spool valve 31 for the first hydraulic subsystem 29*a* is arranged to switch passage of fluid to different ones of the multiple outlet ports 35*a*, 35*c* at different times. Similarly, a second spool valve 31 for the second hydraulic subsystem 29*b* is arranged to switch passage of fluid to different ones of the multiple outlet ports 35*b*, 35*d*, a third spool valve 31 for the third hydraulic subsystem 29*c* is arranged to switch passage of fluid to different ones of the multiple outlet ports 35*e*, 35*g*, and a fourth spool valve 31 for the fourth hydraulic subsystem 29*d* is arranged to switch passage of fluid to different ones of the multiple outlet ports 35*f*, 35*h* at different times The operation of the switching means 31 may be controlled by any suitable means, for example, via pushing by an additional lobe of the camshaft 7. Other means are possible, such as electronic or hydraulic or pneumatic means.

An example of operation of the hydraulic system 3 at a first point in time is described below, with reference to FIG. 10A.

At the time represented in FIG. 10A, one of the first lobes 71*a* biases the first master piston 41*a* of the first hydraulic subsystem 29*a*. The first master piston 41*a* is visibly displaced by the lobe 71*a* relative to the positions of the master pistons 41*c*, 41*d* of the third and fourth hydraulic subsystems 29*c*, 29*d*. Solenoid valve 43*a* is closed, blocking a port to the hydraulic accumulator 45*a*. The spool valve 31 of the first hydraulic subsystem 29*a* is in its first switching state. The movement of the first master piston 41*a* displaces the hydraulic fluid along passage C1V1, causing first slave piston 21*a* to move the first intake valve 23*a* of the first combustion chamber 25*a* (movement not shown).

At the time represented in FIG. 10A, one of the second lobes 71*b* biases the second master piston 41*b* of the second hydraulic subsystem 29*b*. The second master piston 41*b* is visibly displaced by the lobe 71*b* relative to the positions of the master pistons 41*c*, 41*d* of the third and fourth hydraulic subsystems 29*c*, 29*d*. Solenoid valve 43*b* is closed, blocking a port to the hydraulic accumulator 45*b*. The spool valve 31 of the second hydraulic subsystem 29*b* is in its first switching state. The movement of the second master piston 41*b* displaces the hydraulic fluid along passage C1V2, causing second slave piston 21*b* to move the second intake valve 23*b* of the first combustion chamber 25*a* (movement not shown).

Figure 10D:
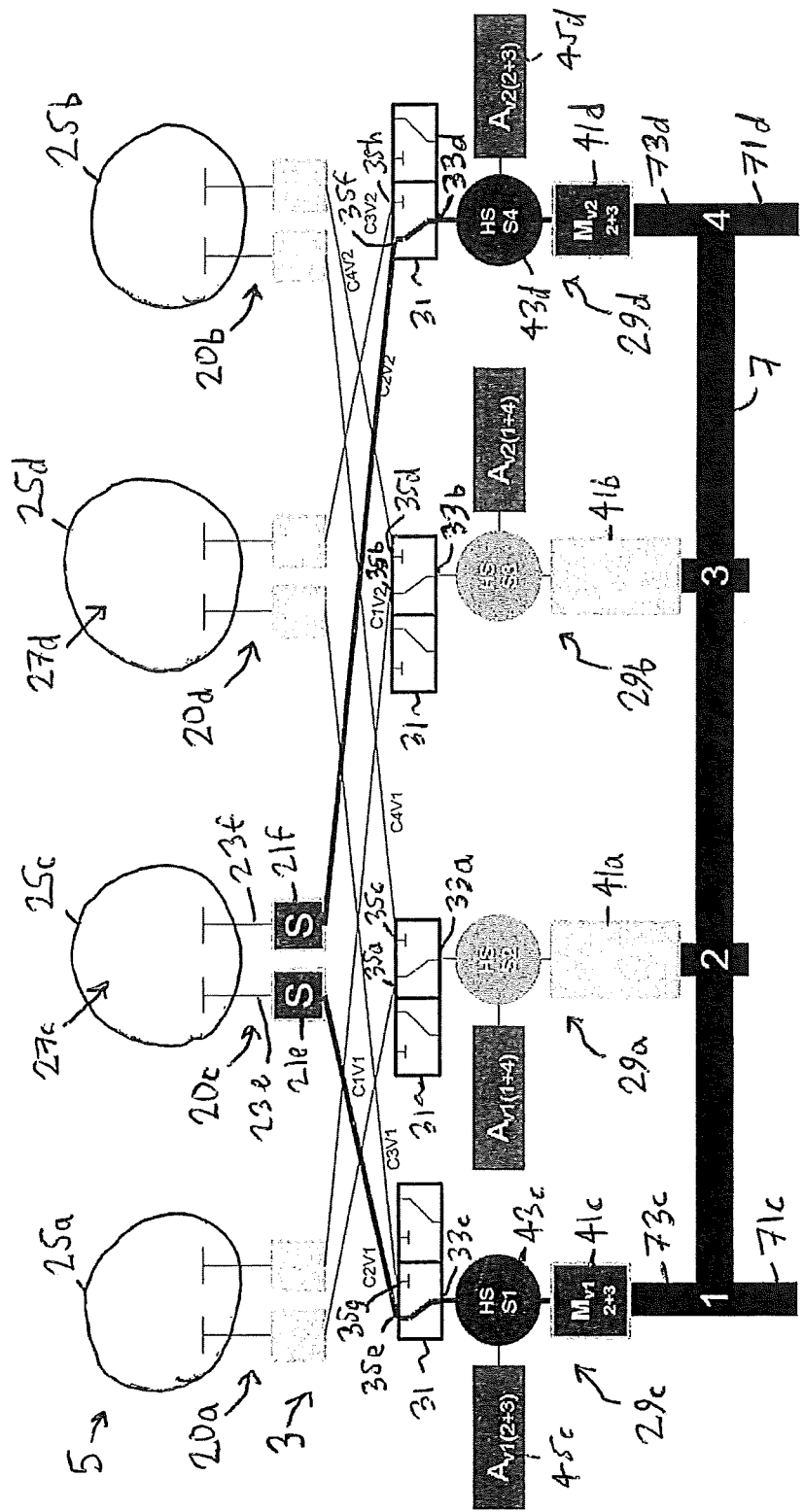

FIGS. 10B to 10D show the operation of the hydraulic system 3 of FIG. 10A at three sequential later points in time of the four-stroke combustion cycle. The internal combustion engine 5, sets 20*a*-20*d* of intake valves, hydraulic subsystems 29*a*-29*d* and camshaft 7 are as described above in relation to FIG. 10A.

At the time represented in FIG. 10B, the internal combustion engine 5 has completed the intake stroke in the first combustion chamber 25*a*, the combustion stroke of the second combustion chamber 25*b*, the compression stroke of the third combustion chamber 25*c*, and the exhaust stroke of the fourth combustion chamber 25*d*. The cylinder piston 27*d* of the fourth combustion chamber 25*d* is performing its intake stroke. The cylinder piston 27*c* of the third combustion chamber 25*c* is performing its combustion stroke.

At the time represented in FIG. 10B, the camshaft 7 has rotated by 90 degrees about its axial length since the time represented in FIG. 10A. The first lobes 71*a*, 73*a* and second lobes, 71*b*, 73*b* are no longer visible in FIG. 10B as they now radially extend perpendicular to the plane of the camshaft 7 cross-section of FIGS. 10A-10D. The master pistons 41*a*, 41*b* of the first and second hydraulic subsystems 29*a*, 29*b* have returned to resting positions. The third lobes 71*c*, 73*c* and fourth lobes 71*d*, 73*d* are visible in FIG. 10B as they now radially extend parallel to the plane of the camshaft 7 cross-section of FIGS. 10A and 10D.

At the time represented in FIG. 10B, one of the third lobes 71*c* biases the third master piston 41*c* of the third hydraulic subsystem 29*c*, causing third master piston 41*c* to move. The third hydraulic subsystem 29*c* is filled with substantially incompressible hydraulic fluid. Solenoid valve 43*c* is closed, blocking a port to the hydraulic accumulator 45*c*. The spool valve 31 of the third hydraulic subsystem 29*c* is in its second switching state. The movement of the third master piston 41*c* displaces the hydraulic fluid along passage C3V1, causing seventh slave piston 21*g* to move the first intake valve 23*g* of the fourth combustion chamber 25*d* (movement not shown).

At the time represented in FIG. 10B, one of the fourth lobes 71*d* biases the fourth master piston 41*d* of the fourth hydraulic subsystem 29*d*, causing fourth master piston 41*d* to move. The fourth hydraulic subsystem 29*d* is filled with substantially incompressible hydraulic fluid. Solenoid valve 43*d* is closed, blocking a port to the hydraulic accumulator 45*d*. The spool valve 31 of the fourth hydraulic subsystem 29*d* is in its second switching state. The movement of the fourth master piston 41*d* displaces the hydraulic fluid along passage C3V2, causing eighth slave piston 21*h* to move the second intake valve 23*h* of the fourth combustion chamber 25*d* (movement not shown).

At the time represented in FIG. 10O, the internal combustion engine 5 has completed the intake stroke in the fourth combustion chamber 25*d* and the combustion stroke in the third combustion chamber 25*c*. The cylinder piston 27*a* of the first combustion chamber 25*a* is performing its combustion stroke. The cylinder piston 27*b* of the second combustion chamber 25*b* is performing its intake stroke.

At the time represented in FIG. 10O, the camshaft 7 has rotated by 90 degrees about its axial length since the time represented in FIG. 10B. The third lobes 71*c*, 73*c* and fourth lobes 71*d*, 73*d* are no longer visible in FIG. 10C as they now radially extend perpendicular to the plane of the camshaft 7 cross-section of FIGS. 10A and 10D. The master pistons 41*c*, 41*d* of the third and fourth hydraulic subsystems 29*c*, 29*d* have returned to resting positions. The first lobes 71*a*, 73a and second lobes 71b, 73b are visible in FIG. 10C as they now radially extend parallel to the plane of the camshaft 7 cross-section of FIGS. 10A and 10D.

At the time represented in FIG. 10C, the other of the radially opposing first lobes 71a, 73a mentioned in relation to FIG. 10A, in this case lobe 73a, biases against the first master piston 41a of the first hydraulic subsystem 29a, causing first master piston 41a to move. Solenoid valve 43a is closed, blocking a port to the hydraulic accumulator 45a. The spool valve 31 of the first hydraulic subsystem 29a is in its second switching state, having switched from its first switching state to its second switching state at or near the time described in FIG. 10B. The movement of the first master piston 41a displaces the hydraulic fluid along passage C4V1, causing third slave piston 21c to move the first intake valve 23c of the second combustion chamber 25b (movement not shown).

At the time represented in FIG. 10C, the other of the radially opposing second lobes 71b, 73b mentioned in relation to FIG. 10A, in this case lobe 73b, biases against the second master piston 41b of the second hydraulic subsystem 29b, causing second master piston 41b to move. Solenoid valve 43b is closed, blocking a port to the hydraulic accumulator 45b. The spool valve 31 of the second hydraulic subsystem 29b is in its second switching state, having switched from its first switching state to its second switching state at or near the time described in FIG. 10B. The movement of the second master piston 41b displaces the hydraulic fluid along passage C4V2, causing fourth slave piston 21d to move the second intake valve 23d of the second combustion chamber 25b (movement not shown).

At the time represented in FIG. 10D, the internal combustion engine 5 has completed the above intake stroke in the second combustion chamber 25b and the combustion stroke in the first combustion chamber 25a. The cylinder piston 27c of the third combustion chamber 25c is performing its intake stroke. The cylinder piston 27d of the fourth combustion chamber 25d is performing its combustion stroke.

At the time represented in FIG. 10D, the camshaft 7 has rotated by 90 degrees about its axial length since the time represented in FIG. 10C. The first lobes 71a, 73a and second lobes, 71b, 73b are no longer visible in FIG. 10D as they now radially extend perpendicular to the plane of the camshaft 7 cross-section of FIGS. 10A and 10D. The master pistons 41a, 41b of the first and second hydraulic subsystems 29a, 29b have returned to resting positions. The third lobes 71c, 73c and fourth lobes 71d, 73d are visible in FIG. 10D as they now radially extend parallel to the plane of the camshaft 7 cross-section of FIGS. 10A and 10D.

At the time represented in FIG. 10D, the other of the radially opposing third lobes 71c, 73c mentioned in relation to FIG. 10B, in this case lobe 73c, biases against the third master piston 41c of the third hydraulic subsystem 29c, causing third master piston 41c to move. Solenoid valve 43c is closed, blocking a port to the hydraulic accumulator 45c. The spool valve 31 of the third hydraulic subsystem 29c is in its first switching state, having switched from its second switching state to its first switching state at or near the time described in FIG. 10C. The movement of the third master piston 41c displaces the hydraulic fluid along passage C2V1, causing fifth slave piston 21e to move the first intake valve 23e of the third combustion chamber 25c (movement not shown).

At the time represented in FIG. 10D, the other of the radially opposing fourth lobes 71d, 73d mentioned in relation to FIG. 10B, in this case lobe 73d, biases against the fourth master piston 41d of the fourth hydraulic subsystem 29d, causing fourth master piston 41d to move. Solenoid valve 43d is closed, blocking a port to the hydraulic accumulator 45d. The spool valve 31 of the fourth hydraulic subsystem 29d is in its first switching state, having switched from its second switching state to its first switching state at or near the time described in FIG. 10C. The movement of the fourth master piston 41d displaces the hydraulic fluid along passage C2V2, causing sixth slave piston 21f to move the second intake valve 23f of the third combustion chamber 25c (movement not shown).

Referring to the above description of FIGS. 10A-10D, it has been shown that the movements of intake valves of each combustion chamber are controlled by separate hydraulic subsystems, beneficially enabling independent valve opening.

Referring to the above description of FIGS. 10A-10D, at least one of the solenoid valves 43a-43d could have been opened to open its port to its hydraulic accumulator 45a-45d. This would have caused the internal volume within the respective hydraulic subsystem 29a-29d to reduce by a lesser extent, or not reduce at all. This would have controlled the timing and extent of lifting of the respective intake valves 23a-23h. The solenoid valves 43a-43d therefore enable continuously variable control of valve lifting in each respective hydraulic subsystem 29a-29d.

Referring to the above description of FIGS. 10A-10D, it has been shown that the switching means 31, in the form of spool valves 31, cycled through a plurality of switching states, which prevented all of the intake valves associated with each hydraulic subsystem from opening at once, thereby preventing intake valves from opening during combustion strokes, avoiding damage to the internal combustion engine 5.

FIG. 11A illustrates an example transverse cross section through the camshaft 7 of FIG. 10A. The camshaft 7 comprises first lobes 71a, 73a as a double lobe formation at a single axial position on the camshaft 7, and third lobes 71c, 73c as a double lobe formation at a different single axial position on the camshaft 7. Second lobes 71b, 73b and fourth lobes 71d, 73d are not shown.

In the example of FIG. 11A, each double lobe formation has two noses associated therewith, each nose defining a maximum lift. The noses are azimuthally separated by 180 degrees (±45 degrees) on the camshaft 7. Flanks extend from both sides of the noses to a base circle 76 of the camshaft 7. The base circle 76 corresponds to zero lift of an intake valve. The maximum lift of each lobe is derived by subtracting the base circle radius from the maximum radius of the each lobe. The exposed base circle 76 may be negligibly small if the flanks converge at single points. The flanks may extend into regions associated with exhaust strokes of combustion chambers, allowing opening times of intake valves to occur earlier than closing times of exhaust poppet valves. Each lobe may be symmetrical in transverse cross-section, or asymmetrical, to control the lift path of the intake valve.

The term 'base circle' of the camshaft is not intended to suggest a specific camshaft radius or azimuthal position. The term 'base circle' can merely be regarded as any region of the camshaft incapable of pushing an element adjacent the camshaft.

In some, but not necessarily all examples, lobes may be differently shaped to vary the intake valve lifting characteristics. Maximum lifts of lobes may be identical, or different to enable different maximum intake valve lift amounts.

FIG. 11B is another cross-section of the camshaft 7 illustrating switching portions 75a, 77a on the camshaft 7, at a different axial location on the camshaft 7 from the first lobes 71a, 73a. The switching portions 75a, 77a are for causing switching operations to occur in the hydraulic system 3, causing the switching means 31 of at least the first hydraulic subsystem 29a to cycle through a plurality of switching states over the course of one revolution of the camshaft 7.

The switching portions 75a, 77a rise from the base circle 76 to define flanks 75a, 77a of a single switching lobe 78. The single switching lobe 78 comprises a broad nose 78 having a substantially constant radius over approximately half the circumference of the camshaft. The base circle 76 of the camshaft 7 may be exposed over approximately half the circumference of the camshaft 7.

The switching portions 75a, 77a are arranged to ensure that a switching operation of the switching means 31 of at least the first hydraulic subsystem 29a does not interrupt operation of at least the first hydraulic subsystem 29a. This is achieved by aligning the switching portions 75a, 77a with sections of exposed base circle 76 shown in FIG. 11A between the first lobes 71a, 73b.

Further switching portions of a similar design may be provided at different axial locations on the camshaft 7, associated with switching means 31 of other hydraulic subsystems 29b-29d.

FIGS. 12-14G relate to a method and a controller 9 for implementing the method of operation described above with regard to FIGS. 10A-10D.

FIG. 12 illustrates an example controller 9. The controller 9 may be a chip or a chip set. The controller 9 may form part of one or more systems comprised in a vehicle 1. The controller 9 may be operable in use to control the valve train hydraulic system 3 of the vehicle 1.

Implementation of a controller 9 may be as controller circuitry. The controller 9 may be implemented in hardware alone, have certain aspects in software including firmware alone or can be a combination of hardware and software (including firmware).

As illustrated in FIG. 12 the controller 9 may be implemented using instructions that enable hardware functionality, for example, by using executable instructions of a computer program 95 in a general-purpose or special-purpose processor 91 that may be stored on a computer readable storage medium (disk, memory, etc.) to be executed by such a processor 91.

The processor 91 is configured to read from and write to the memory 93. The processor 91 may also comprise an output interface via which data and/or commands are output by the processor 91 and an input interface via which data and/or commands are input to the processor 91.

The memory 93 stores a computer program 95 comprising computer program instructions 97 (computer program code) that controls the operation of the controller 9 when loaded into the processor 91. The computer program instructions 97, of the computer program 95, provide the logic and routines that enables the controller 9 to control the solenoid valves 43a-43d. The processor 91 by reading the memory 93 is able to load and execute the computer program 95.

Although the memory 93 is illustrated as a single component/circuitry it may be implemented as one or more separate components/circuitry some or all of which may be integrated/removable and/or may provide permanent/semi-permanent/dynamic/cached storage.

Although the processor 91 is illustrated as a single component/circuitry it may be implemented as one or more separate components/circuitry some or all of which may be integrated/removable. The processor 91 may be a single core or multi-core processor.

As illustrated in FIG. 13, the computer program 95 may arrive at the controller 9 via any suitable delivery mechanism 99. The delivery mechanism 99 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 95. The delivery mechanism 99 may be a signal configured to reliably transfer the computer program 95. The controller 9 may propagate or transmit the computer program 95 as a computer data signal.

For purposes of this disclosure, it is to be understood that the controller(s) 9 described herein can each comprise a control unit or computational device having one or more electronic processors. A vehicle 1 and/or an apparatus 201 of a vehicle 1 may comprise a single control unit or electronic controller or alternatively different functions of the controller(s) may be embodied in, or hosted in, different control units or controllers. A set of instructions could be provided which, when executed, cause the controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

FIG. 14A illustrates an example time history demonstrating operation of a first hydraulic subsystem 29a to control lifting of the first and third slave pistons 21a, 21c for a two or a four cylinder internal combustion engine in accordance with a first mode of operation, in which two intake valves are opened in respect of each combustion chamber during an intake stroke of the respective cylinder piston and no intake valves remain closed during those intake strokes. Similarly, FIG. 14B illustrates an example time history demonstrating operation of a second hydraulic subsystem 29b to control lifting of the second and fourth slave pistons 21b, 21d for the two or four cylinder internal combustion engine in accordance with the first mode of operation. A common time axis is shown for FIGS. 14A-14B, representing two complete revolutions of a crankshaft, corresponding to a complete four-stroke combustion cycle. Timings may differ as appropriate for different internal combustion engine configurations.

The y-axes of FIGS. 14A-14B represent open or closed states of ports in the solenoid valves 43a and 43b respectively as commanded by electronic control signals 101, 103, 105, 107. The ports are for the respective hydraulic accumulators 45a, 45b. Closed ports to hydraulic accumulators enable greater intake valve lift and open ports to hydraulic accumulators disable intake valve lift.

The electronic control signals 101, 103, 105, 107 may represent high signals causing a normally open accumulator port to be closed, or low signals causing a normally closed accumulator port to be open. The electronic control signals 101, 103, 105, 107 may be permitted to have a plurality of levels for commanding partially closed accumulator ports for continuously variable intake valve opening.

In the example, the controller 9 transmits the electronic control signals 101, 105 to solenoid valve 43a of the first hydraulic subsystem 29a and transmits the electronic control signals 103, 107 to solenoid valve 43b of the second hydraulic subsystem 29b.

In this example, the electronic control signals 101, 103, 105, 107 command the respective solenoid valves 43a, 43b to close their respective hydraulic accumulator ports. The resulting fluid displacement and motion of slave pistons is as described above in relation to FIGS. 10A-10D. The y-axis of FIG. 14C represents a switching state of a switching means 31, with 'A' representing a first switching state and 'B' representing a second switching state. The resulting lifting of the intake valves 23a-23d is described with reference to an example illustrated in FIGS. 14D-14G. The y-axes of FIGS. 14D-14G represent lift distances of intake valves 23a-23d respectively, with 'h' representing lift height. The time axes of FIGS. 14C-14G are aligned with the time axes of FIGS. 14A-14B.

Between 0 and 180 degrees, an intake stroke occurs in the first combustion chamber 25a. During this time, the lobes 71a and 71b of the camshaft 7 push the master pistons 41a and 41b of the first and second hydraulic subsystems 29a and 29b respectively. The solenoid valves 43a and 43b are operable to control the resulting intake valve lift profiles. The switching means 31 of the first and second hydraulic subsystems 29a and 29b are in the first switching state 'A' to control which of slave pistons 21a-21d are operated by the pressure rise. In the example but not necessarily all examples, the electronic control signal 101 to the solenoid valve 43a of the first hydraulic subsystem 29a is transmitted simultaneously with the electronic control signal 103 to the solenoid valve 43b of the second hydraulic subsystem 29b. The first intake valve 23a of the first combustion chamber 25a opens at the same time as the second intake valve 23b of the first combustion chamber 25a. FIGS. 14D and 14E show corresponding lifts of the first and second intake valves 23a, 23b of the first combustion chamber 25a respectively. The late opening of the intake valves 23a and 23b means that their maximum lift is reduced.

Between 180 degrees and 360 degrees, neither the first combustion chamber 25a nor the second combustion chamber 25b requires an intake stroke. If the internal combustion engine 5 comprises four combustion chambers, such as in FIG. 10A, electronic control signals to a third hydraulic subsystem 29c and a fourth hydraulic subsystem 29d may be transmitted within this period. During this time the switching means 31 of the first and second hydraulic subsystems 29a and 29b switch to the second switching state 'B' as shown in FIG. 14C.

Between 360 degrees and 540 degrees, an intake stroke occurs in the second combustion chamber 25b. During this time, the lobes 73a and 73b of the camshaft 7 push the master pistons 41a and 41b of the first and second hydraulic subsystems 29a and 29b respectively. The solenoid valves 43a and 43b are operable to control the resulting intake valve lift profiles. The switching means 31 of the first and second hydraulic subsystems 29a and 29b are in the second switching state 'B'. In the example but not necessarily all examples, the electronic control signal 107 to the solenoid valve 43b of the second hydraulic subsystem 29b is transmitted simultaneously with the electronic control signal 105 to the solenoid valve 43a of the first hydraulic subsystem 29a. The second intake valve 23d of the second combustion chamber 25b opens at the same time as the first intake valve 23c of the second combustion chamber 25b. FIGS. 14F and 14G show corresponding lifts of the first and second intake valves 23c, 23d of the second combustion chamber 25b respectively.

Between 540 degrees and 720 degrees, neither the first combustion chamber 25a nor the second combustion chamber 25b requires an intake stroke. If the internal combustion engine 5 comprises four combustion chambers, such as in FIG. 10A, electronic control signals to a third hydraulic subsystem 29c and a fourth hydraulic subsystem 29d may be transmitted within this period. During this time the switching means 31 of the first and second hydraulic subsystems 29a and 29b switch to the first switching state 'A', in preparation for the next combustion cycle, starting with an intake stroke in the first combustion chamber 25a.

By way of contrast, FIG. 15A-15D illustrate an example timing history in the second mode of operation, in which one intake valve of each combustion chamber of the internal combustion engine 5 is opened during an intake stroke, and one intake valve is kept closed.

FIG. 15A illustrates an example time history demonstrating operation of the first hydraulic subsystem 29a of FIG. 10A to control lifting of the first and third slave pistons 21a, 21c for a two or a four cylinder internal combustion engine in accordance with the first mode of operation. FIG. 15B illustrates an example time history demonstrating operation of a second hydraulic subsystem 29b of FIG. 10A to control lifting of the second and fourth slave pistons 21b, 21d for the two or four cylinder internal combustion engine in accordance with the first mode of operation. Timings may differ as appropriate for different internal combustion engine configurations.

The y-axes of FIGS. 15A-15B represent open or closed states of ports in the solenoid valves 43a and 43b respectively as commanded by electronic control signals 101' and 107'.

In the example, the controller 9 transmits the electronic control signals 101', to solenoid valve 43a of the first hydraulic subsystem 29a and transmits the electronic control signals 107' to solenoid valve 43b of the second hydraulic subsystem 29b.

In this example, the electronic control signals 101', 107' command the respective solenoid valves 43a, 43b to close their respective hydraulic accumulator ports. The y-axis of FIG. 15C represents the switching state of the switching means 31, with 'A' representing a first switching state and 'B' representing a second switching state. The resulting lifting of the intake valves 23a-23d is described with reference to an example illustrated in FIGS. 15D-15G.

Between 0 and 180 degrees, an intake stroke occurs in the first combustion chamber 25a. During this time, the lobes 71a and 71b of the camshaft 7 push the master pistons 41a and 41b of the first and second hydraulic subsystems 29a and 29b respectively. The switching means 31 of the first and second hydraulic subsystems 29a and 29b control which of slave pistons 21a-21d are operable by the pressure rise. In the present example, the switching means 31 is initially in the 'A' state so that slave pistons 21a and 21b are operable. However, during this period (between 0 and 180 degrees) an electronic control signal 101' is only provided to solenoid valve 43a to cause it to close and enable actuation of the slave piston 21a. No such signal is provided to solenoid valve 43b and therefore it remains open and the slave piston 21b is not actuated. Consequently, the intake valve 23a is opened but intake valve 23b remains closed as shown in FIGS. 15D and 15E.

Between 360 degrees and 540 degrees, an intake stroke occurs in the second combustion chamber 25b. During this time, the lobes 73a and 73b of the camshaft 7 push the master pistons 41a and 41b of the first and second hydraulic subsystems 29a and 29b respectively. The switching means 31 of the first and second hydraulic subsystems 29a and 29b are in the second switching state 'B' so that slave pistons 21c and 21d are operable. However, during this period (between 360 and 540 degrees) an electronic control signal 107' is only provided to solenoid valve 43b to cause it to close and enable actuation of the slave piston 21d. No such signal is provided to solenoid valve 43a and therefore it remains open and the slave piston 21c is not actuated. Consequently, the intake valve 23d is opened but intake valve 23c remains closed as shown in FIGS. 15F and 15G.

An alternative to the above-described second mode of operation is illustrated by FIGS. 16A-16D, in which one intake valve of each combustion chamber of the internal combustion engine 5 is opened by a first distance during an intake stroke, and another intake valve is opened by a smaller second distance.

FIG. 16A illustrates an example time history demonstrating operation of the first hydraulic subsystem 29a of FIG. 10A to control lifting of the first and third slave pistons 21a, 21c for a two or a four cylinder internal combustion engine in accordance with the first mode of operation. FIG. 16B illustrates an example time history demonstrating operation of a second hydraulic subsystem 29b of FIG. 10A to control lifting of the second and fourth slave pistons 21b, 21d for the two or four cylinder internal combustion engine in accordance with the first mode of operation. Timings may differ as appropriate for different internal combustion engine configurations.

The y-axes of FIGS. 16A-16B represent open or closed states of ports in the solenoid valves 43a and 43b respectively as commanded by electronic control signals 101", 103", 105" and 107".

In the example, the controller 9 transmits the electronic control signals 101" and 105", to solenoid valve 43a of the first hydraulic subsystem 29a and transmits the electronic control signals 103" and 107" to solenoid valve 43b of the second hydraulic subsystem 29b.

In this example, the electronic control signals 101", 103", 105" and 107" command the respective solenoid valves 43a, 43b to close their respective hydraulic accumulator ports. The y-axis of FIG. 16C represents the switching state of the switching means 31, with 'A' representing a first switching state and 'B' representing a second switching state. The resulting lifting of the intake valves 23a-23d is described with reference to an example illustrated in FIGS. 16D-16G.

The operation of the hydraulic system 3 is similar to that described above in respect of FIG. 14A-14G for the first mode of operation, but in the present example, the signals provided for opening each of the two intake valves in a combustion chamber are different to each other. The signal 103" is shorter in duration and begins later than the signal 101" resulting in the second valve 23b being lifted later than, and for a shorter period than the first valve 23a of the first combustion chamber. Also, the lift distance of the first valve 23a is larger than that of the second valve 23b.

Similarly, the signal 105" is shorter in duration and begins later than the signal 107" resulting in the second valve 23c being lifted later than, and for a shorter period than the first valve 23d of the first combustion chamber. Also, the lift distance of the first valve 23d is larger than that of the second valve 23c.

The blocks illustrated in the FIGS. 7 and 8 may represent steps in a method and/or sections of code in the computer program 97. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

For example, alternatives to solenoid valves are possible. Any suitable valves may be used, achieving equivalent effect.

Whilst the terms 'inlet' and 'outlet' have been used in relation to hydraulic ports, this language is not intended to suggest that fluid can only travel in one direction through the port.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for controlling intake valves for an internal combustion engine, the apparatus comprising:
   a hydraulic system configured to hydraulically actuate a first intake valve and a second intake valve of a first combustion chamber of an internal combustion engine; and
   a controller configured to control the hydraulic system in at least a first mode of operation and a second mode of operation,
   wherein in the first mode of operation, the controller is configured to control the hydraulic system to selectively cause lifting of the first and second intake valves of the first combustion chamber during each intake stroke of a respective cylinder piston, and
   in the second mode of operation the controller is configured to control the hydraulic system to cause lifting of the first intake valve during at least one intake stroke of the respective cylinder piston and disable actuation of the second intake valve during the at least one intake stroke, wherein the first and second intake valves are configured to close first and second intake ports respectively of the first combustion chamber, and
wherein at least one of the first intake port and the second intake port of the first combustion chamber is provided with masking to increase air velocities into the first combustion chamber.

2. An apparatus according to claim 1, wherein in the first mode of operation the first and second intake valves are arranged to open simultaneously and close simultaneously, and the first and second intake ports are configured to provide tumble motion of air in the combustion chamber.

3. An apparatus according to claim 1, wherein in the second mode of operation the first intake port is configured to
cause swirl motion of air in the first combustion chamber when the first intake valve is lifted by a first distance, and
cause a combination of swirl and tumble motion when the first intake valve is lifted by a second distance that is larger than the first distance.

4. An apparatus according to claim 1, wherein the first mode or the second mode is selected in dependence on a required engine torque.

5. An apparatus according to claim 1, wherein the controller is arranged to receive an input signal indicative of required engine torque from a user input device, and the first mode or the second mode is selected in dependence on the received input signal.

6. An apparatus according to claim 1, wherein the controller is arranged to cause transitioning the first mode and the second mode in two successive intake strokes.

7. An apparatus according to claim 6, wherein the controller is arranged to cause the first intake valve to have a first lifting distance, in the second mode of operation, during one of the two successive intake strokes, and to cause the first intake valve and the second intake valve to have a second lifting distance, in the first mode of operation, that is smaller than the first lifting distance in another one of the two successive intake strokes.

8. An apparatus according to claim 6, wherein the controller is arranged to cause the first intake valve to open for a first opening period of time, in the second mode of operation, during one of the two successive intake strokes, and to cause the first intake valve and the second intake valve to open, in the first mode, for a second opening period of time that is shorter than the first opening period of time in another one of the two successive intake strokes.

9. An apparatus according to claim 1, wherein the hydraulic system comprises:
a master piston, which is arranged to be actuated by a camshaft;
a slave piston arranged to actuate the first intake valve and to be actuated by movement of hydraulic fluid in a passage caused by movement of the master piston; and
valve means arranged to enable hydraulic fluid to be released from the passage to allow lifting of the first intake valve to be varied,
wherein the controller is arranged to: cause the valve means to release hydraulic fluid for a first period at a beginning of an intake stroke to cause late intake valve opening; cause the valve means to close for a second period to cause intake valve lifting; and cause the valve means to provide a second release of hydraulic fluid in a third period of the intake stroke to cause early intake valve closing.

10. An apparatus according to claim 9, wherein the hydraulic system comprises:
a second slave piston configured to lift the second intake valve in dependence on movement of hydraulic fluid in a second passage during the first mode of operation; and
a second valve means operable to release hydraulic fluid from the second passage to prevent movement of the second slave piston during the second mode of operation.

11. An internal combustion engine, comprising the apparatus according to claim 1.

12. An internal combustion engine according to claim 11, wherein, in the first mode of operation, the first and second intake valves are arranged to open simultaneously and close simultaneously and the first and second intake ports are configured to provide tumble motion of air in the combustion chamber.

13. An internal combustion engine according to claim 11, wherein in the second mode of operation the first intake port is configured to
cause swirl motion of air in the first combustion chamber when the first intake valve is lifted by a first distance, and
cause a combination of swirl and tumble motion when the first intake valve is lifted by a second distance that is larger than the first distance.

14. A vehicle having an internal combustion engine according to claim 11.

15. A method of controlling intake valves for an internal combustion engine including combustion chambers, each combustion chamber having a respective cylinder piston, a first intake valve and a second intake valve, the method comprising:
in a first mode of operation, causing hydraulic actuation of the first and second intake valves of a first combustion chamber during each intake stroke of the respective cylinder piston; and
in a second mode of operation, causing hydraulic actuation of the first intake valve of the first combustion chamber and disabling actuation of the second intake valve of the first combustion chamber during each intake stroke of the respective cylinder piston,
wherein the first and second intake valves are configured to close first and second intake ports respectively of the first combustion chamber, and
wherein at least one of the first intake port and the second intake port of the first combustion chamber is provided with masking to increase air velocities into the first combustion chamber.

16. A method according to claim 15, wherein during a first of two successive intake strokes, in the second mode of operation, the first intake valve has a first lifting distance, and, during a second of the two successive intake strokes, in the first mode of operation, the first intake valve and the second intake valve have a second lifting distance that is smaller than the first lifting distance.

17. A method according to claim 15, wherein during a first of two successive intake strokes, in the second mode of operation, the first intake valve is open for a first opening period of time, and, during a second of the two successive intake strokes, in the first mode of operation, the first intake valve and the second intake valve are open for a second opening period of time, the second opening period of time being shorter than the first opening period of time.

18. A method according to claim 15, comprising:
causing valve means to release hydraulic fluid for a first period at a beginning of at least one intake stroke to cause late intake valve opening;
causing the valve means to close for a second period in the at least one intake stroke to cause intake valve lifting; and
causing the valve means to provide a second release of hydraulic fluid in a third period of the at least one intake stroke to cause early intake valve closing.

19. A non-transitory storage medium containing a computer program that when run on a processor causes the processor to perform the method of claim 15.

20. An electronic controller for controlling intake valves for an internal combustion engine, the electronic controller being configured to control a hydraulic system for actuating a first intake valve and a second intake valve of a first combustion chamber of the internal combustion engine,
wherein in a first mode of operation, the electronic controller is configured to control the hydraulic system to cause lifting of the first and second intake valves of the first combustion chamber during an intake stroke of a respective cylinder piston, and in a second mode of operation, the electronic controller is configured to control the hydraulic system to cause lifting of the first intake valve of the first combustion chamber during at least one intake stroke of the respective cylinder piston and disable actuation of the second intake valve of the first combustion chamber during the at least one intake stroke, wherein the first and second intake valves are configured to close first and second intake ports respectively of the first combustion chamber, and wherein at least one of the first intake port and the second intake port of the first combustion chamber is provided with masking to increase air velocities into the first combustion chamber.

* * * * *